(12) United States Patent
Onoda et al.

(10) Patent No.: US 7,582,015 B2
(45) Date of Patent: *Sep. 1, 2009

(54) PROGRAM, INFORMATION STORAGE MEDIUM AND GAME SYSTEM

(75) Inventors: Hiroyuki Onoda, Yokohama (JP); Hiroumi Endo, Adachi-ku (JP); Hiroshi Igarashi, Yokohama (JP); Junji Takamoto, Kyoto (JP); Takeshi Nagareda, Kyoto (JP)

(73) Assignees: Namco Bandai Games Inc., Tokyo (JP); Nintendo Co., Ltd., Kyoto-Shi (JP)

( * ) Notice: Subject to any disclaimer, the term of this patent is extended or adjusted under 35 U.S.C. 154(b) by 477 days.

This patent is subject to a terminal disclaimer.

(21) Appl. No.: 10/936,579

(22) Filed: Sep. 9, 2004

(65) Prior Publication Data

US 2005/0085297 A1 Apr. 21, 2005

(30) Foreign Application Priority Data

Sep. 12, 2003 (JP) ............................. 2003-321945
Dec. 10, 2003 (JP) ............................. 2003-412467

(51) Int. Cl.
*A63F 13/00* (2006.01)
(52) U.S. Cl. ................ 463/30; 463/39; 463/7; 463/37
(58) Field of Classification Search ............. 463/7, 463/37
See application file for complete search history.

(56) References Cited

U.S. PATENT DOCUMENTS

| 6,227,968 | B1 * | 5/2001 | Suzuki et al. ............ 463/7 |
| 6,379,244 | B1 | 4/2002 | Sagawa et al. |
| 6,582,309 | B2 | 6/2003 | Higurashi et al. |
| 6,645,067 | B1 * | 11/2003 | Okita et al. ............ 463/7 |
| 2002/0025842 | A1 * | 2/2002 | Nobe et al. ............ 463/7 |

(Continued)

FOREIGN PATENT DOCUMENTS

JP    A-11-151380    6/1999

(Continued)

OTHER PUBLICATIONS

U.S. Appl. No. 10/935,181, filed Sep. 8, 2004, Hiroyuki Onoda et al.

(Continued)

*Primary Examiner*—John M Hotaling, II
*Assistant Examiner*—Jeffrey Wong
(74) *Attorney, Agent, or Firm*—Oliff & Berridge, PLC

(57) ABSTRACT

A game system includes: a direction mark storage section which stores image data of a direction mark which directs an operation of a player; a display control section which performs display control of a plurality of display objects including the direction mark; a timing acquisition section which acquires an operation timing; and an evaluation section which compares the acquired operation timing with a reference timing and evaluates the operation of the player. The display control section performs control of displaying the direction mark which directs the player to operate a plurality of operation regions by one mark. When the player operates the plurality of the operation regions of the operation section, the evaluation section evaluates the operation of the player by comparing the operation timing for the plurality of operation regions and the reference timing.

18 Claims, 15 Drawing Sheets

LEFT
 RIGHT
 BOTH

U.S. PATENT DOCUMENTS

2005/0101364 A1 * 5/2005 Onoda et al. .................. 463/7

FOREIGN PATENT DOCUMENTS

| JP | A-2000-148168 | 5/2000 |
| JP | A-2000-218046 | 8/2000 |
| JP | A-2000-237455 | 9/2000 |
| JP | A-2001-070636 | 3/2001 |
| JP | A-2001-187270 | 7/2001 |
| JP | 2001-212369 | 8/2001 |
| JP | A-2001-232057 | 8/2001 |
| JP | A-2001-232062 | 8/2001 |
| JP | A-2001-246155 | 9/2001 |
| JP | A-2001-269483 | 10/2001 |
| JP | A-2001-321564 | 11/2001 |
| JP | A-2002-066128 | 3/2002 |
| JP | A-2002-066129 | 3/2002 |
| JP | A-2002-301263 | 10/2002 |
| JP | A-2002-328673 | 11/2002 |

OTHER PUBLICATIONS

U.S. Appl. No. 10/936,592, filed Sep. 9, 2001, Hiroyuki Onoda et al.
U.S. Appl. No. 10/936,589, filed Sep. 9, 2004, Hiroyuki Onoda et al.

* cited by examiner

FIG. 9A  NORMAL
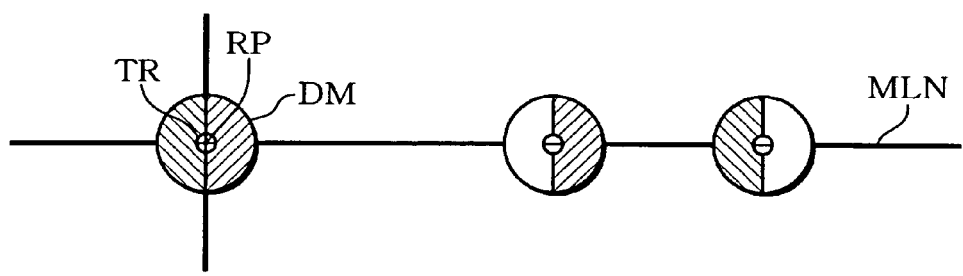
FIG. 9B  BONUS TIME
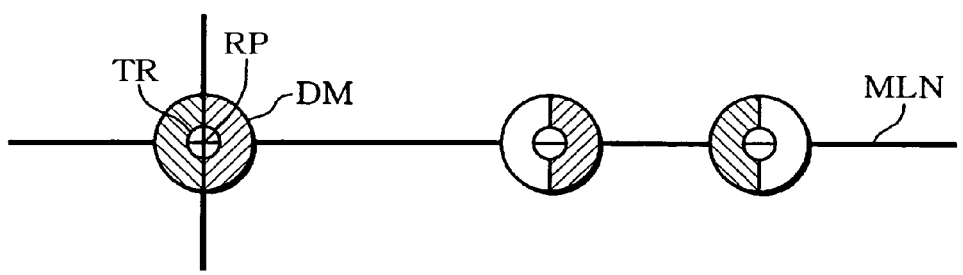

PROGRAM, INFORMATION STORAGE MEDIUM AND GAME SYSTEM

Japanese Patent Application No. 2003-321945 filed on Sep. 12, 2003 and Japanese Patent Application No. 2003-412467, filed on Dec. 10, 2003 are hereby incorporated by reference in its entirety.

BACKGROUND OF THE INVENTION

The present invention relates to a program, an information storage medium, and a game system.

A game system for allowing a player to play a music game has been conventionally known. In this game system, music is output from a sound output section, and a direction mark (note) for directing the operation timing of the player is displayed in a display section. The player enjoys the music game by performing the operation according to the displayed direction mark while listening to the output music.

In this conventional music game system, only one operation can be directed by one direction mark. Specifically, when the operation section includes a plurality of operation regions, one direction mark can merely direct the player to operate one operation region. Therefore, in order to direct the player to operate a plurality of operation regions of the operation section, it is necessary to display a plurality of direction marks corresponding to each operation. In more detail, a plurality of lines are provided, and the direction mark is moved on each line. When directing the player to operate first and second operation regions of the operation section at the same time, a first direction mark which moves on a first line and a second direction mark which moves on a second line are moved in parallel. The player operates the first and second operation regions at the same time aiming at a timing at which the positions of the first and second direction marks coincide with a reference position. When the timings are judged to coincide, points are added to the score of the player.

However, this conventional method has a problem in which it is difficult for the player to determine whether or not the first and second direction marks moved in parallel require a simultaneous operation.

BRIEF SUMMARY OF THE INVENTION

A first aspect of the present invention relates to a program for a music game in which a player plays by operating an operation section, the program causing a computer to function as:

a direction mark storage section which stores image data of a direction mark which directs an operation which is performed by the player using the operation section;

a display control section which performs display control of a plurality of display objects including the direction mark based on the image data of the direction mark;

a timing acquisition section which acquires an operation timing when the player operates the operation section according to a direction of the direction mark; and an evaluation section which compares the acquired operation timing with a reference timing and evaluates the operation of the player based on a comparison result, wherein the display control section performs display control of displaying the direction mark which directs the player to operate a plurality of operation regions of the operation section by one mark, and changing a relative positional relationship between the direction mark and a reference position for timing judgment to cause the direction mark and the reference position to come closer.

A second aspect of the present invention relates to a program for a percussion instrument game in which a player plays by performing an operation of beating a percussion instrument type controller, the program causing a computer to function as:

a direction mark storage section which stores image data of a direction mark which directs a beat operation which is performed by the player using the percussion instrument type controller;

a display control section which performs display control of a plurality of display object including the direction mark based on the image data of the direction mark;

a timing acquisition section which acquires a beat timing when the player has performed an operation of beating the percussion instrument type controller according to a direction of the direction mark; and an evaluation section which compares the acquired beat timing with a reference timing and evaluates the beat operation of the player based on a comparison result, wherein the display control section performs display control of displaying the direction mark which directs the player to operate a plurality of beat regions of the percussion instrument type controller by one mark, and changing a relative positional relationship between the direction mark and a reference position for timing judgment to cause the direction mark and the reference position to come closer.

A third aspect of the present invention relates to a computer-readable information storage medium which stores any one of the above programs.

A fourth aspect of the present invention relates to a game method for a music game in which a player plays by operating an operation section, the method comprising:

storing image data of a direction mark which directs an operation which is performed by the player using the operation section;

performing display control of a plurality of display objects including the direction mark based on the image data of the direction mark;

acquiring an operation timing when the player operates the operation section according to a direction of the direction mark;

comparing the acquired operation timing with a reference timing and evaluating the operation of the player based on a comparison result; and performing display control of displaying the direction mark which directs the player to operate a plurality of operation regions of the operation section by one mark, and changing a relative positional relationship between the direction mark and a reference position for timing judgment to cause the direction mark and the reference position to come closer.

A fifth aspect of the present invention relates to a game method for a percussion instrument game in which a player plays by performing an operation of beating a percussion instrument type controller, the method comprising:

storing image data of a direction mark which directs a beat operation which is performed by the player using the percussion instrument type controller;

performing display control of a plurality of display object including the direction mark based on the image data of the direction mark;

acquiring a beat timing when the player has performed an operation of beating the percussion instrument type controller according to a direction of the direction mark;

comparing the acquired beat timing with a reference timing and evaluating the beat operation of the player based on a comparison result; and performing display control of displaying the direction mark which directs the player to operate a plurality of beat regions of the percussion instrument type controller by one mark, and changing a relative positional relationship between the direction mark and a reference position for timing judgment to cause the direction mark and the reference position to come closer.

BRIEF DESCRIPTION OF THE SEVERAL VIEWS OF THE DRAWING

FIGS. 9A and 9B are illustrative of a method of notifying a player of a change in evaluation standard.

DETAILED DESCRIPTION OF THE EMBODIMENT

Figure 1A:
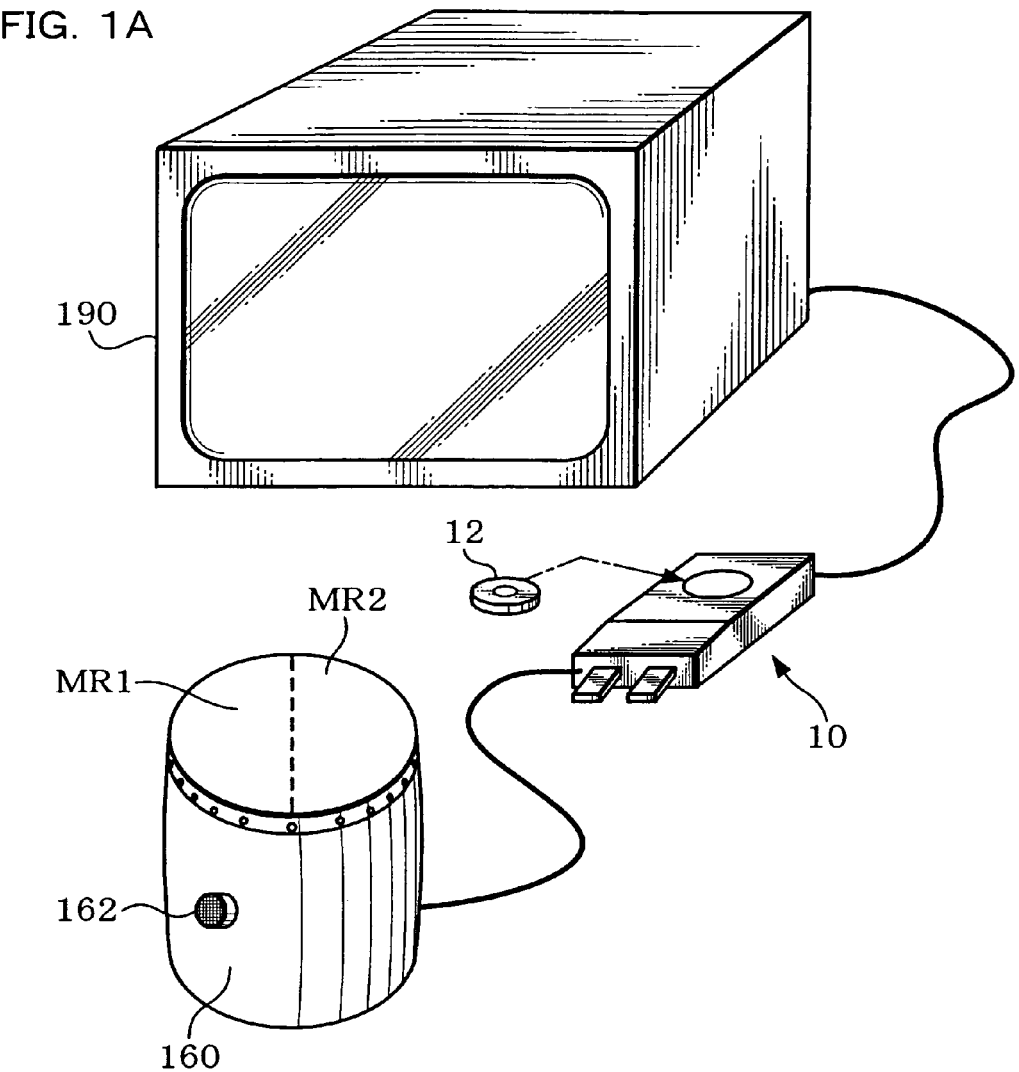
FIGS. 1A and 1B show examples of a game system of one embodiment of the present invention.

The present invention has been achieved in view of the above-described situation. The present invention may provide a program, an information storage medium, and a game system suitable for a music game in which a player plays using an operation section including a plurality of operation regions.

An embodiment of the present invention provides a game system for a music game in which a player plays by operating an operation section, the system including:

a direction mark storage section which stores image data of a direction mark which directs an operation which is performed by the player using the operation section;

a display control section which performs display control of a plurality of display objects including the direction mark based on the image data of the direction mark;

a timing acquisition section which acquires an operation timing when the player operates the operation section according to a direction of the direction mark; and an evaluation section which compares the acquired operation timing with a reference timing and evaluates the operation of the player based on a comparison result, wherein the display control section performs display control of displaying the direction mark which directs the player to operate a plurality of operation regions of the operation section by one mark, and changing a relative positional relationship between the direction mark and a reference position for timing judgment to cause the direction mark and the reference position to come closer.

Another embodiment of the present invention provides a program which causes a computer to function as the above sections.

A further embodiment of the present invention provides a computer-readable information storage medium which stores a program causing a computer to function as the above sections.

According to these embodiments, control of displaying the direction mark which can direct the player to operate a plurality of operation regions of the operation section by one mark is performed. Then, display control of changing the relative positional relationship between the direction mark and the reference position (reference mark) for timing judgment to cause the direction mark and the reference mark to come closer is performed. As described above, in the present embodiment, the operation of the player is evaluated by directing not only the operation of one operation region but also the operations of a plurality of operation regions using one direction mark. Therefore, the player can be simply notified of the direction of the operations of a plurality of operation regions, whereby the operation interface environment can be improved.

With these game system, program, and information storage medium, the display control section may perform display control of the direction mark which includes a plurality of direction regions, each of the direction regions corresponding to one of the operation regions of the operation section.

This enables the positional relationship (disposition relationship) to coincide between the operation region of the operation section and the direction region of the direction mark, the player can be more simply notified of directions for a plurality of operation regions. Specifically, the direction mark in a shape in which the arrangement of the operation regions (operation members) of the operation section are imitatively displayed can be displayed, whereby the player can easily determine the operation region to be operated from the direction mark.

With these game system, program, and information storage medium, the display control section may perform display control of the direction mark which has a first shape and a first color when directing the player to operate one of the operation regions of the operation section and has the first shape and a second color when directing the player to operate a plurality of the operation regions.

This enables not only the operation of one operation region but also operations of a plurality of operation regions to be directed using the direction mark in the same shape.

With these game system, program, and information storage medium, when the player operates a plurality of the operation regions of the operation section according to a direction of the direction mark, the evaluation section may evaluate the operation of the player by comparing the operation timing for the plurality of operation regions and the reference timing.

With these game system, program, and information storage medium, the evaluation section may evaluate the operation of the player by extracting two operations performed at operation timings between which a time interval is shortest among a plurality of operations performed for the plurality of the operation regions, and comparing the operation timing with the reference timing for one of the two extracted operations of which the operation timing differs to a larger extent from the reference timing.

This enables the operation of the player to be highly evaluated not only when one of the operation timings of two operations (two operations for different operation regions) is good, but also when the operation timings of the two operations are good. This enables the operations of the player of a plurality of operation regions to be effectively evaluated by using simple processing.

With these game system, program, and information storage medium, the direction mark may include a timing judgment region for judging the operation timing, and the evaluation section may evaluate the operation of the player by judging whether or not the player has operated the operation regions of the operation section at a timing at which a position of the timing judgment region of the direction mark coincides with the reference position.

This enables the player to operate the operation region at a suitable timing using the timing judgment region which is smaller than the direction mark as a mark, even if the direction mark is large, whereby the operation interface environment of the player can be improved.

With these game system, program, and information storage medium, the display control section may perform display control of changing an image of at least a part of the direction mark in synchronization with a reference pace of music.

This enables the player to easily cause the operation timing to coincide with the reference timing by operating the operation section corresponding to the reference pace of the music and the change in the image of at least a part of the direction mark.

With these game system, program, and information storage medium, the display control section may perform display control of the direction mark so that the reference position for timing judgment is positioned within the direction mark at both timings at which the player starts and finish a repeated operation or continuous operation using the operation section.

This enables the player to easily recognize the start timing and finish timing of a repeated operation or a continuous operation.

With these game system, program, and information storage medium, the display control section may perform display control of causing the direction mark to direct the player to perform a strong or weak operation for each of the operation regions of the operation section, and when the player operates a plurality of the operation regions of the operation section, the evaluation section may evaluate the operation of the player by judging whether the operation performed for each of the operation regions is the strong operation or the weak operation according to the direction of the direction mark.

This enables whether or not the player has accurately operated the operation region at the strength directed by the direction mark to be evaluated, whereby the fun of the music game can be increased.

With these game system, program, and information storage medium, when a standard of the timing judgment in the evaluation section changes, the display control section may perform display control of visually notifying the player of the change in the standard of the timing judgment.

This enables the player to easily know the change in the timing standard when playing the game, whereby the operation interface environment can be further improved.

With these game system, program, and information storage medium, the display control section may perform control of displaying a first direction mark which directs the player to perform an operation which is performed by using the operation section, and a second direction mark which directs the player to perform a sound input operation which is detected by a sound detection section, and in a case in which the operation of the operation section and the sound input operation by the player are judged to have been performed within the same period, the timing acquisition section may judge that the operation of the operation section is effective and acquires operation timing of the operation of the operation section, and in a case other than the case in which the operation of the operation section and the sound input operation by the player are judged to have been performed within the same period, the timing acquisition section may judge that the operation of the operation section and the sound input operation are effective and acquires the operation timings of the operation of the operation section and the sound input operation.

The first direction mark and the second direction mark are displayed, and the player performs the operation of the operation section or the sound input operation corresponding to the type of the displayed direction mark. The first direction mark directs the player to operate the operation section (other than the sound input operation section), and the second direction mark directs the player to perform the sound input operation which is detected by the sound detection section. The sound input operation (sound input operation) may generate sound due to the operation of the player. The sound input operation is a sound production operation, a handclap operation, a beat sound production operation by beating something (percussion instrument sound production operation, for example), a vibration sound production operation by vibrating something (stringed instrument sound production operation, for example), or the like.

When the operation of the operation section and the sound input operation by the player are judged to be performed within a given period (when the operation of the operation section and the sound input operation are accepted within the input acceptance period for a single direction mark, for example), the operation of the operation section (input data from the operation section) is judged to be effective. In this case, it is judged that the probability is high that the player has operated the operation section and the operation sound is accidentally detected by the sound detection section. The operation of the operation section is judged to be a normal operation to prevent an incorrect input from the sound detection section or the like and accurately detect that the operation of the operation section has been performed.

In other cases (when it is judged that the operation of the operation section and the sound input operation are not performed within the given period, or when it is judged that the operation of the operation section and the sound input operation are performed in different periods), since it is judged that the probability of an incorrect input is low, each of the operation of the operation section and the sound input operation is judged to be effective. Therefore, according to the present embodiment, even a configuration in which different types of input operations such as the operation of the operation section and the sound input operation are performed, the operation of the operation section and the sound input operation can be accurately detected.

The expression "operation is effective" means that the data input by the operation becomes data which is used for game calculation (acquisition processing of operation timing, evaluation processing of operation/sound input operation, for example). In other words, the data input by the operation becomes data relating to the operation intended by the player or the sound input operation intended by the player. Specifically, the expression "operation is not effective" means that the data input by the operation is data relating to the operation which is not intended by the player (erroneously input operation), and is data which is not used for the game calculation.

With these game system, program, and information storage medium, the display control section may use a mask-displayed direction mark, and may perform display control of changing a relative positional relationship between the mask-displayed direction mark and the reference position for timing judgment based on movement operation information of the direction mark before masking corresponding to the mask-displayed direction mark, the timing acquisition section may acquire an operation timing when the player operates the operation section according to a direction of the mask-displayed direction mark, and the evaluation section may compare the acquired operation timing with the reference timing based on operation content information of the direction mark before masking corresponding to the mask-displayed direction mark, and may evaluate the operation of the player based on a comparison result.

The expression "masking the direction mark" means displaying the information on the operation content directed by the direction mark (information on the operation region which should be operated or the like; excluding timing information) in such a form that the player cannot see the information. For example, the mask-displayed direction mark may be displayed in such a form that the direction mark is covered with a mask (cover which covers the shape, color, pattern, or the like), or the model information of the direction mark may be changed in such a shape that the player cannot identify the information on the operation content (information relating to the operation region which should be operated or the like; excluding timing information). This includes the case of using a mark in a certain shape irrespective of the operation content, for example.

For example, when a predetermined mode is selected by the player, a game or the like is performed in which a mask-displayed direction mark is displayed instead of the direction mark displayed in the normal mode.

In this case, since the display control section changes the mask-displayed direction mark based on the movement operation information of the direction mark before masking, the relationship between the mask-displayed direction mark and the reference position is the same as the relationship between the direction mark before masking and the reference position.

The direction mark before masking can direct a plurality of different operation contents by changing the combination of the shape, pattern, color, and the like, which are components of one mark. However, the player cannot determine the operation content directed by the mask-displayed direction mark from the displayed image by masking the direction mark. However, since the mask-displayed direction mark is moved in the same manner as the direction mark before masking which corresponds in the displayed image, the player can determine the operation input timing from the displayed image.

The evaluation section compares the acquired operation timing with the reference timing based on the operation content information of the direction mark before masking corresponding to the mask-displayed direction mark, and evaluates the operation of the player based on the comparison result.

Therefore, a game can be realized in which the player who remembers the content of the direction mark before masking presumes the content of the direction mark before masking and performs the operation input based on his memory while watching the mask-displayed direction mark.

A still further embodiment of the present invention provides a game system for a percussion instrument game in which a player plays by performing an operation of beating a percussion instrument type controller, the system including:

a direction mark storage section which stores image data of a direction mark which directs a beat operation which is performed by the player using the percussion instrument type controller;

a display control section which performs display control of a plurality of display object including the direction mark based on the image data of the direction mark;

a timing acquisition section which acquires a beat timing when the player has performed an operation of beating the percussion instrument type controller according to a direction of the direction mark; and an evaluation section which compares the acquired beat timing with a reference timing and evaluates the beat operation of the player based on a comparison result, wherein the display control section performs display control of displaying the direction mark which directs the player to operate a plurality of beat regions of the percussion instrument type controller by one mark, and changing a relative positional relationship between the direction mark and a reference position for timing judgment to cause the direction mark and the reference position to come closer.

An even further embodiment of the present invention provides a program which causes a computer to function as the above sections.

A yet further embodiment of the present invention provides a computer-readable information storage medium which stores a program causing a computer to function as the above sections.

According to these embodiments, the operation of the player is evaluated by directing not only the operation of one operation region but also the operations of a plurality of operation regions using one direction mark. Therefore, the player can be simply notified of the direction for beating of a plurality of operation regions, whereby the operation interface environment in a percussion instrument game can be improved.

With these game system, program, and information storage medium, the display control section may use a mask-displayed direction mark, and may perform display control of changing a relative positional relationship between the mask-displayed direction mark and the reference position for timing judgment based on movement operation information of the direction mark before masking corresponding to the mask-displayed direction mark, the timing acquisition section may acquire the beat timing when the player performs the operation of beating the percussion instrument type controller according to a direction of the mask-displayed direction mark, and the evaluation section may compare the acquired beat timing with the reference timing based on operation content information of the direction mark before masking corresponding to the mask-displayed direction mark, and may evaluate the operation of beating of the player based on a comparison result.

Embodiments of the present invention are described below. Note that the embodiments described hereunder do not in any way limit the scope of the invention defined by the claims laid out herein. Note also that not all of the elements of these embodiments should be taken as essential requirements to the means of the present invention.

1. Configuration

FIG. 1A shows an example of a game system of the present embodiment. The game system includes an operation section 160 (percussion instrument type controller) which imitates the shape of a percussion instrument such as a drum, a main device 10 (game device or image generation device), and a display section 190. The game system includes a sound detection section 162 (microphone, for example) which detects environmental sound. When the sound detection section 162 detects sound, the sound detection section 162 outputs analog data of the sound or digital data after A/D conversion to the main device 10.

The operation section 160 includes operation regions MR1 and MR2 (a plurality of operation regions in a broad sense). A player beats the left operation region MR1 (beat region) with the left hand, and beats the right operation region MR2 with the right hand. A sensor (not shown) is provided inside the operation section 160 corresponding to each of the operation regions MR1 and MR2, and whether the operation region MR1 or the operation region MR2 is operated can be detected by using these sensors. When the operation region is operated, operation sound (performance sound of musical instrument) associated with each operation region is output from the sound output section.

The main device 10 performs game processing based on operation data from the operation section 160, sound detection data from the sound detection section 162, and a program stored in an information storage medium 12 (CD, DVD, or the like) to generate a game image and game sound. The generated game image is displayed in the display section 190, and the generated game sound (music) is output from a sound output section (speaker) of the display section 190. In this case, operation data obtained by operating the operation region MR1 and operation data obtained by operating the operation region MR2 are input to the main device 10, and a game processing is performed based on the operation data.

In FIG. 1A, the operation section 160 and the main device 10 are separately provided. However, the game system may have a configuration in which the main device 10 (game processing section, image generation section, and sound generation section) is provided in the operation section 160. In this case, the operation section 160 (game controller) is directly connected with the display section 190, a game image is displayed in the display section 190, and game sound is output from the sound output section of the display section 190.

Figure 1B:
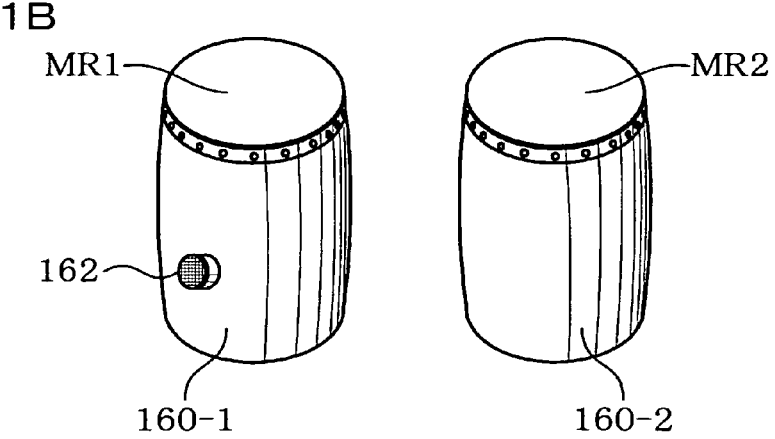

FIG. 1A shows a consumer game device as an example. However, the present invention may be applied to an arcade game device. In FIG. 1A, two operation regions (operation members) MR1 and MR2 are provided. However, three or more operation regions may be provided. As shown in FIG. 1B, one or more operation regions may be provided to each of two physically separated operation sections 160-1 and 160-2.

Figure 2:
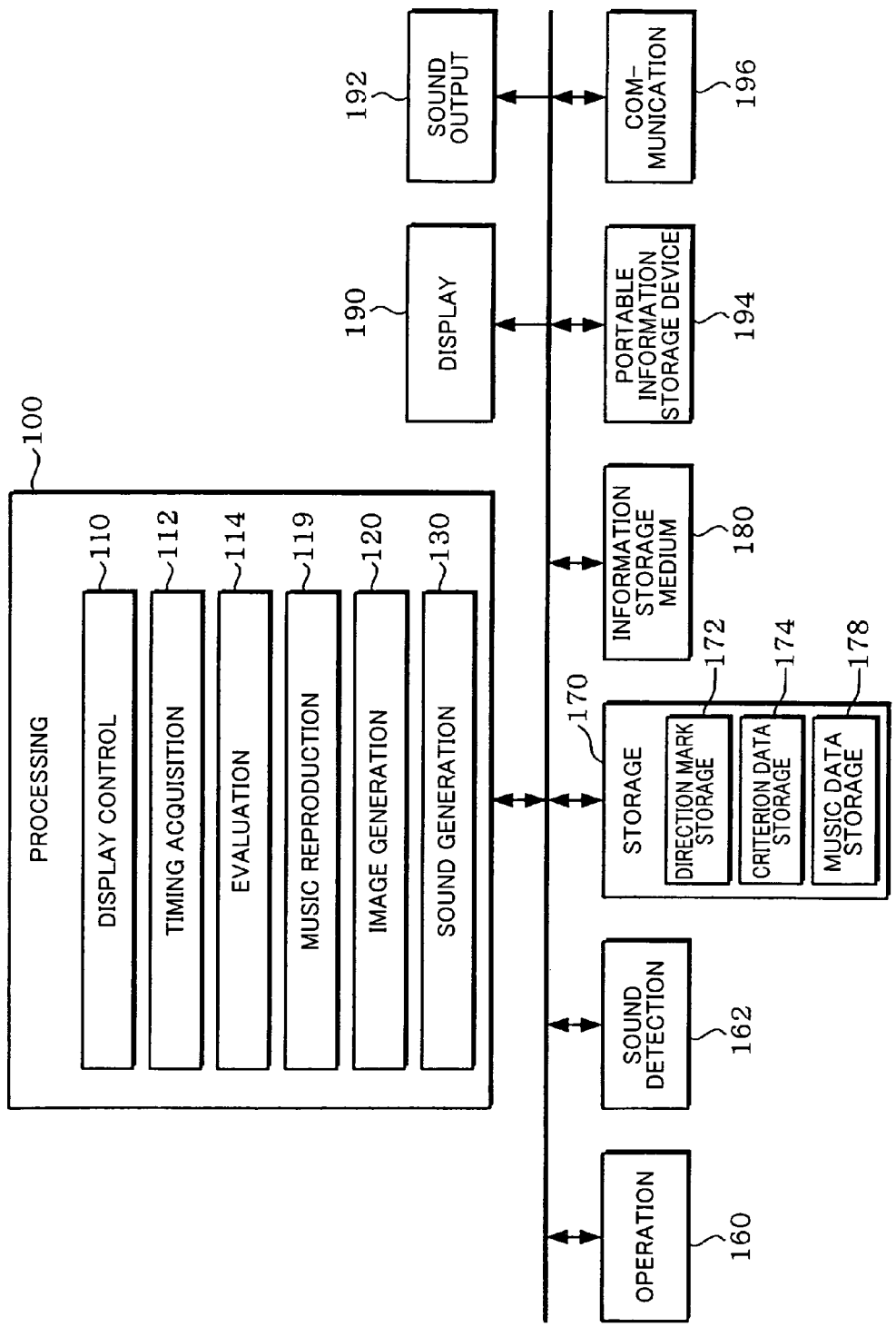
FIG. 2 shows a functional block diagram of a game system of an embodiment of the present invention.

FIG. 2 shows an example of a functional block diagram of a game system (image generation system) of the present embodiment. The game system of the present embodiment does not necessarily include all of the components (each section) shown in FIG. 2. The game system may have a configuration in which some of the components are omitted. A music game realized by the game system (program) of the present embodiment is a game in which a player plays music using an operation section (musical instrument type controller) which imitates a musical instrument, a game in which a player dances to music, or the like.

The operation section 160 allows a player to input operation data. The function of the operation section 160 may be realized by hardware such as a controller which imitates a percussion instrument (musical instrument in a broad sense) as shown in FIGS. 1A and 1B, an operation button, an operation lever, or a step in a dance type music game.

The sound detection section 162 may be realized by hardware such as a sound input microphone. The sound detection section 162 may include an A/D converter which converts analog sound data into digital sound data, a processor (circuit) which performs various types of processing on sound data, and the like.

A storage section 170 provides a work area for a processing section 100, a communication section 196, and the like. The function of the storage section 170 may be realized by hardware such as a RAM.

An information storage medium 180 (computer-readable medium) stores a program, data, and the like. The function of the information storage medium 180 may be realized by hardware such as an optical disk (CD or DVD), a magneto-optical disk (MO), a magnetic disk, a hard disk, a magnetic tape, or a memory (ROM). The processing section 100 performs various types of processing of the present embodiment based on the program (data) stored in the information storage medium 180. Specifically, a program for allowing a computer to function as each section of the present embodiment (program for allowing a computer to execute processing of each section) is stored in the information storage medium 180.

The display section 190 outputs an image generated by the present embodiment. The function of the display section 190 may be realized by hardware such as a CRT, an LCD, a touch panel type display, or a head mount display (HMD). A sound output section 192 outputs sound generated by the present embodiment. The function of the sound output section 192 may be realized by hardware such as a speaker or a headphone. A portable information storage device 194 stores the player's personal data, game save data, and the like. As the portable information storage device 194, a memory card, a portable game device, and the like can be given. The communication section 196 performs various types of control for communicating with the outside (host device or other game system, for example). The function of the communication section 196 may be realized by hardware such as various processors or a communication ASIC, or by a program.

The program (data) for allowing a computer to function as each section of the present embodiment may be distributed to the information storage medium 180 (storage section 170) from an information storage medium included in a host device (server) through a network and the communication section 196. Use of the information storage medium of the host device (server) may be included within the scope of the present invention.

The processing section 100 (processor) performs various types of processing such as game processing, image generation processing, or sound generation processing based on operation data from the operation section 160, sound detection data from the sound detection section 162, a program, and the like. As the game processing performed by the processing section 100, processing of starting a game when a game start condition is satisfied, processing of proceeding with a game, processing of disposing a display object (object) such as a direction mark or a character, processing of displaying a display object, processing of calculating a game result, processing of terminating a game when a game end condition is satisfied, and the like can be given. The processing section 100 performs various types of processing using the storage section 170 as a work area. The function of the processing section 100 may be realized by hardware such as various processors (CPU, DSP, or the like) or ASIC (gate array or the like), or by a program (game program).

The processing section 100 includes a display control section 110, a timing acquisition section 112, an evaluation section 114, a music reproduction section 119, an image generation section 120, and a sound generation section 130. The processing section 100 may have a configuration in which some of these sections are omitted.

The display control section 110 performs display control of a plurality of display objects including a direction mark (note mark) and a reference mark. In more detail, the display control section 111 performs processing of disposing a display object (object), processing of moving a display object, processing of changing an image of a display object, and the like. The direction mark is a mark for directing an operation to be performed by a player using the operation section 160, and image data of the direction mark is stored in a direction mark storage section 172 of the storage section 170.

The display control section 110 performs control of displaying a first direction mark which directs the player to perform an operation using the operation section 160, and a second direction mark which directs the player to perform a sound input operation to be detected by the sound detection section 162.

The display control section 110 may use a mask-displayed direction mark generated by masking the direction mark, and perform display control of causing the direction mark and the reference position to come closer by changing the relative positional relationship between the mask-displayed direction mark and the reference position for timing judgment based on the movement operation information of the direction mark before masking corresponding to the mask-displayed direction mark.

In a mask display mode (mode in which the player plays the game while displaying the mask-displayed direction mark), the display control section 110 performs display control of masking the direction mark of the music selected by the player, and outputting the mask-displayed direction mark on the screen, for example.

The image data of the mask-displayed direction mark may be stored in the direction mark storage section 172 of the storage section 170, and the stored image data may be used by reading from the direction mark storage section 172.

The timing acquisition section 112 performs processing of acquiring the operation timing of the player when the player operates the operation section 160 according to the direction of the direction mark (when the player plays the percussion instrument). In more detail, the timing acquisition section 112 monitors and acquires the operation data from the operation section 160 in frame units. The timing acquisition section 112 performs processing of storing the acquired operation data in a given storage buffer. The frame (1/60 or 1/30 sec, for example) is a time unit for performing game processing (motion processing of display object) or image generation processing.

The timing acquisition section 112 judges that the operation of the operation section 160 is effective when it is judged that the operation of the operation section 160 performed by the player and the sound input operation (sound input action) of the player detected by the sound detection section 162 overlap within a given period. The timing acquisition section 112 performs processing of acquiring timing of the operation judged to be effective. In other cases (when it is judged that the operations do not overlap), the timing acquisition section 112 judges that the operation of the operation section 160 and the sound input operation are individually effective. The timing acquisition section 112 performs processing of acquiring timing of each of the operations judged to be effective.

The timing acquisition section 112 may acquire the operation timing of the player when the player operates the operation section according to the direction of the mask-displayed direction mark.

The evaluation section 114 compares the operation timing acquired by the timing acquisition section 112 with a reference timing, and evaluates the operation of the player based on the comparison result. In more detail, data of the reference timing as a model is stored in a criterion data storage section 174 of the storage section 170. The evaluation section 114 reads the stored data of the reference timing, and performs processing of judging the coincidence between the acquired operation timing and the reference timing or processing of judging the degree of difference between the operation timing and the reference timing.

The evaluation section 114 may compare the acquired operation timing with the reference timing based on the operation content information of the direction mark before masking corresponding to the mask-displayed direction mark, and evaluate the operation of the player based on the comparison result.

In the present embodiment, the display control section 110 performs control of displaying the direction mark which can direct the player to operate a plurality of operation regions of the operation section 160 by one mark. When the player operates a plurality of the operation regions of the operation section 160 according to the direction of the direction mark, the evaluation section 114 evaluates the operation of the player by comparing the timings of the operations of the operation regions and the reference timing, and calculates the score of the player or the like.

In a mask display mode (mode in which the player plays the game while displaying the mask-displayed direction mark), the display control section 110 performs display control of mask-displaying the direction mark which can direct the player to operate a plurality of operation regions of the operation section 160 by one mark, for example. When the player operates a plurality of the operation regions of the operation section 160 according to the direction before masking of the mask-displayed direction mark, the evaluation section 114 may evaluate the operation of the player by comparing the timings of the operations of the operation regions and the reference timing, and calculate the score of the player or the like.

A music reproduction section 119 performs reproduction processing of the music data of the music game realized by the present embodiment. In more detail, the music reproduction section 119 performs processing of reading the music data (music data in a broad sense) stored in a music data storage section 178, generating game sound based on the music data, and outputting the game sound to the sound output section 192. The display control section 110 performs control of displaying the direction mark in association with reproduction of the music data. The statement "the direction mark is displayed in association with reproduction of music data" means that movement display of various direction marks and the reference position (reference mark) is started when reproduction of music data (output of music data) is started, and the movement display is finished when the reproduction of music data is finished. In more detail, this means that the display timing of various direction marks is associated with the sound reproduction timing of the music data.

The image generation section 120 performs drawing processing based on the results of various types of processing (game processing) performed by the processing section 100 to generate an image, and outputs the image to the display section 190. The sound generation section 130 performs sound processing based on the results of various types of processing performed by the processing section 100 to generate game sound such as background music (BGM), effect sound, or voice, and outputs the game sound to the sound output section 192.

The game system of the present embodiment may be a system exclusive for a single-player mode in which only one player can play the game, or may be a system provided with a multi-player mode in which a plurality of players can play the game in addition to the single player mode. In the case where a plurality of players play the game, game images and game sound provided to the players may be generated by using one terminal, or generated by using a plurality of terminals connected through a network (transmission line or communication line) or the like.

2. Method of Present Embodiment

A method of the present embodiment is described below with reference to the drawings.

2.1 Direction for Operations of Plurality of Operations Regions

In the present embodiment, evaluation processing of an operation (performance) of a player is performed by displaying a direction mark which directs not only an operation of one operation region but also operations of a plurality of operation regions.

Figure 3:
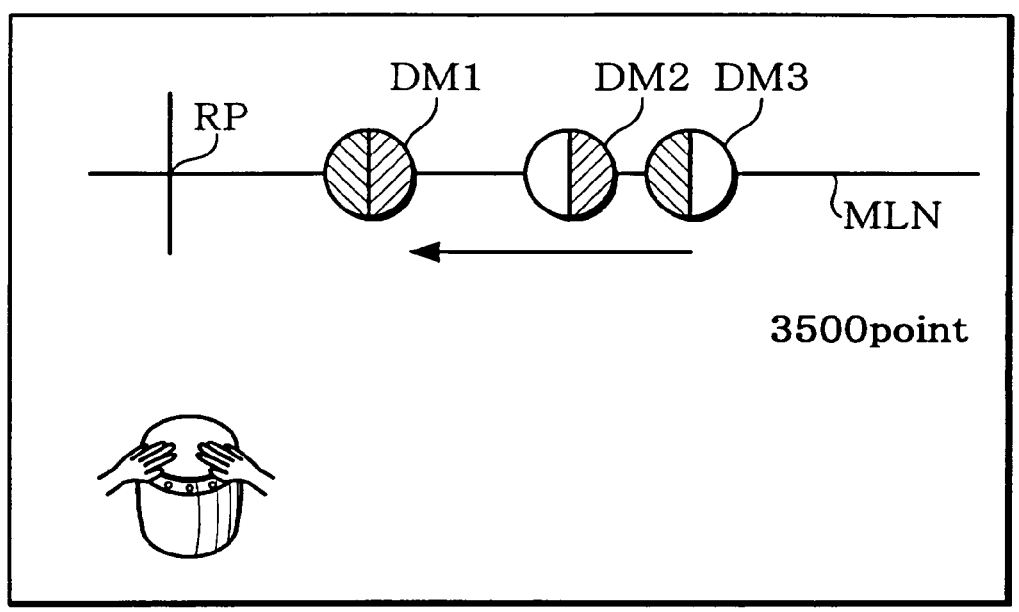
FIG. 3 is illustrative of display control of a direction mark.

In FIG. 3, circular direction marks DM 1 to DM3 are moved on a line MLN from the right to the left on the screen, for example. A player can score by operating the operation section 160 at a timing at which each of the direction marks DM1 to DM3 coincides (almost coincides) with a reference position RP for timing judgment (reference mark or reference line).

In more detail, in FIG. 3, the direction mark DM 1 on the left is a mark which directs simultaneous operations of the operation regions MR1 and MR2, the direction mark DM 2 in the middle is a mark which directs an operation of the operation region MR2 on the right, and the direction mark DM 3 on the right is a mark which directs an operation of the operation region MR1 on the left in FIGS. 1A and 1B. Therefore, when the player succeeds in simultaneously operating (simultaneously beating) the operation regions MR1 and MR2 at a timing at which the direction mark DM1 reaches the position RP, points are added to the score of the player. Points are added to the score of the player when the player operates the operation region MR2 at a timing at which the direction mark DM2 reaches the position of RP or operates the operation region MR1 at a timing at which the direction mark DM3 reaches the position of RP.

As described above, in the present embodiment, the direction mark can direct an operation of one operation region such as the direction marks DM2 and DM3, and can direct operations of two operation regions such as the direction mark DM1. Therefore, the player can be simply notified of the direction for simultaneous operations in comparison with a method of directing simultaneous operations by respectively moving first and second direction marks on first and second lines in synchronization, whereby the operation interface environment of the player can be improved.

In FIG. 3, the direction marks DM1 to DM3 are moved, and the reference position RP is in a standstill state. However, the direction marks DM1 to DM3 may be in a standstill state, and the reference position RP may be moved. Or, the direction marks DM1 to DM3 and the reference position RP may be moved so as to come closer. Specifically, it suffices that display control which causes the reference position (reference mark) RP and the direction marks DM1 to DM3 to come closer be performed by changing the relative positional relationship between the reference position (reference mark) RP for timing judgment and the direction marks DM1 to DM3.

Figures 4A, 4B, 4C:
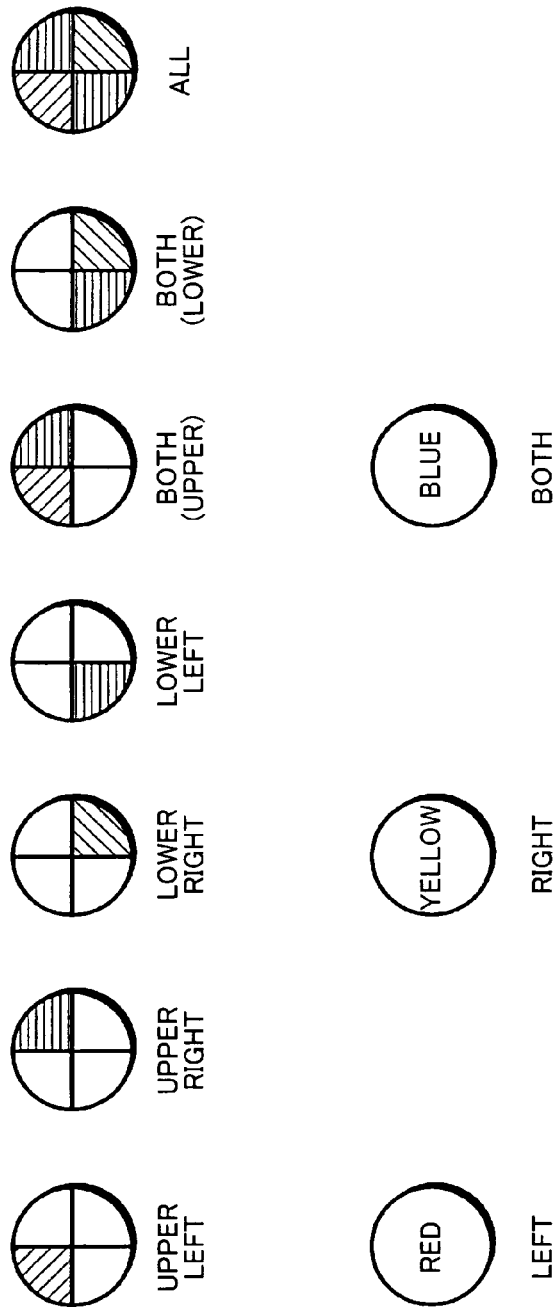
FIGS. 4A, 4B, and 4C are illustrative of direction marks in various forms.

As the direction mark which is display-controlled, various direction marks may be employed. As shown in FIGS. 4A and 4B, direction marks having a plurality of direction regions in which each direction region respectively corresponds to each operation region of the operation section may be used, for example. Specifically, in FIG. 4A, a direction region DR1 on the left (left semicircular region) corresponds to the operation region MR1 on the left in FIGS. 1A and 1B, and a direction region DR2 on the right (right semicircular region) corresponds to the operation region MR2 on the right. The color or brightness (image state in a broad sense) of the direction region DR1 is changed when directing an operation of the operation region MR1, and the color or brightness of the direction region DR2 is changed when directing an operation of the operation region MR2. The colors or brightness of the direction regions DR1 and DR2 is changed when directing operations of the operation regions MR1 and MR2. According to this feature, since the position of the operation region corresponds to the position of the direction region one to one, an operation interface environment which allows the player to easily recognize by sense can be provided. When the number of operation regions is four, four direction regions are provided in the direction mark as shown in FIG. 4B so that each of the four operation regions respectively corresponds to each of the four direction regions. The same description applies to the case where the number of operation regions is three or five or more.

In FIG. 4C, the player is notified of whether the direction is a direction for an operation of one operation region or a direction for operations of a plurality of operation regions by the difference in color of the direction mark. In more detail, when the direction is a direction for an operation of one operation region, a direction mark which is in the shape of a circle (first shape in a broad sense) and in red or yellow (first color in a broad sense) is used. When the direction is a direction for operations of a plurality of (two) operation regions, a direction mark which is in the shape of a circle (first shape in a broad sense) in the same manner as in the case of a direction for an operation of one operation region and is in blue (second color in a broad sense) which is a color differing from red or yellow is used. According to this feature, the player can easily judge that the player should operate the operation region MR1 on the left when the direction mark is red, the player should operate the operation region MR2 on the right when the direction mark is yellow, and the player should operate the operation regions MR1 and MR2 when the direction mark is blue, whereby the operation interface environment can be improved. The assignment of the color to each operation is not limited to the assignment shown in FIG. 4C. Various modifications and variations are possible.

2.2 Evaluation Method

An example of an evaluation method of the present embodiment is described below. In the present embodiment, two operations performed at the shortest operation interval (one operation for different operation regions) among a plurality of operations performed for a plurality of operation regions is extracted (detected). The operation of the player is evaluated by comparing the reference timing with the operation timing of one of the extracted two operations which differs from the reference timing to a larger extent.

Figure 5A:
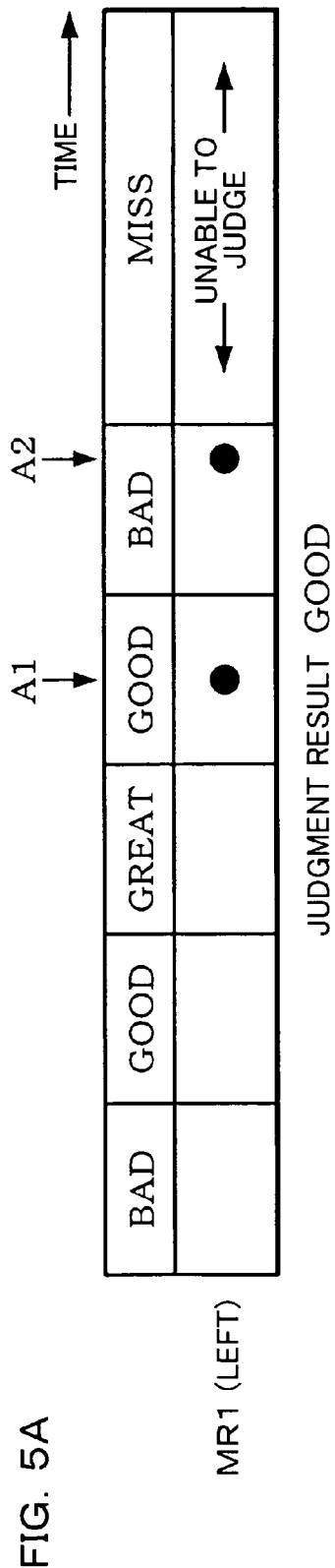
FIGS. 5A and 5B are illustrative of an evaluation method of an operation of a player.

In more detail, in the case of a direction mark which directs an operation of only one operation region (MR1 or MR2) (DM2 or DM3 in FIG. 3), the best operation timing among the timings of the operations performed within an input acceptance time (within a time excluding MISS) is taken as the judgment result. Specifically, the operation of the player is evaluated by comparing the operation timing of which the difference from the reference timing is the smallest with the reference timing. In FIG. 5A, the difference between an operation timing at A1 and the reference timing (timing of GREAT) is smaller than the difference between an operation timing at A2 and the reference timing, for example. Therefore, the operation timing at A1 is taken as the judgment result, and the operation timing is judged to be "GOOD". For example, when the operation timing at A1 is the timing of "GREAT", the judgment result becomes "GREAT".

Figure 5B:
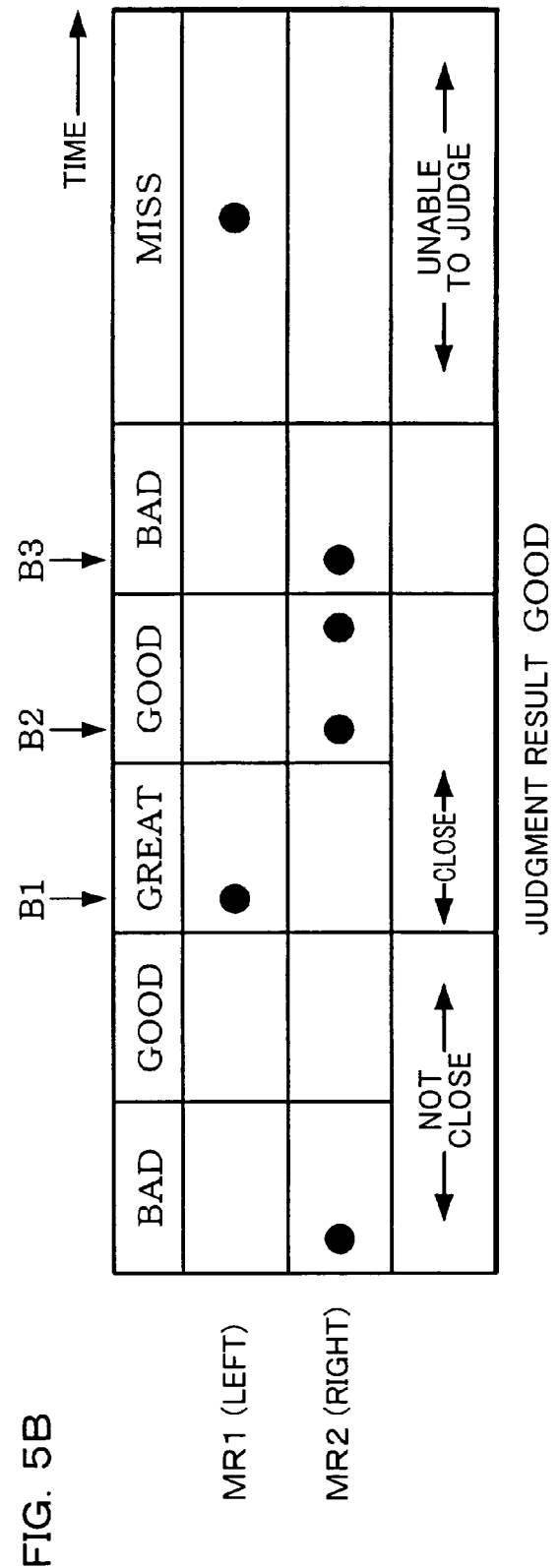

In the case of a direction mark which directs operations of a plurality of operation regions (MR1 and MR2) (DM1 in FIG. 3), the worst timing of the closest two operations (two operations for different operation regions) is taken as the judgment result. Specifically, when the operation inputs for the operation regions have been completed, two operations at the shortest operation interval are extracted (selected). One of the two operation timings which differs from the reference timing to a larger extent is taken as the judgment result. In FIG. 5B, operations at timings B1 and B2 are extracted, for example. The operation timing at the timing B1 which is worst is taken as the judgment result, and the operation timing is judged to be "GOOD". For example, when the two extracted operations are operations at the timing B1 and B3, the operation timing at the timing B3 is taken as the judgment result, and the operation timing is judged to be "BAD".

According to this feature, the player cannot obtain high evaluation if only the operation timing of one of two operations is good, and can obtain high evaluation when both operation timings are good. Therefore, an effective motivation to accurately perform simultaneous operations can be provided to the player, and the simultaneous operations of the player can be effectively evaluated.

2.3 Timing Judgment Region

Figure 6A:
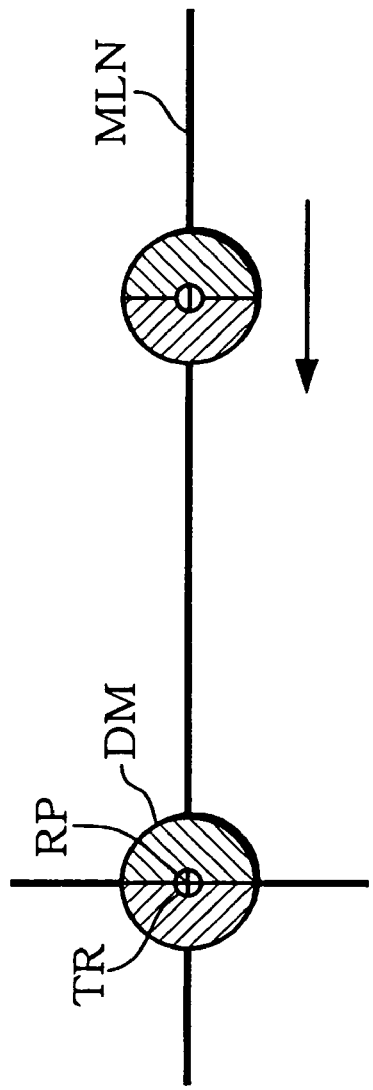
FIGS. 6A and 6B are illustrative of a timing judgment region and blink processing.

In the present embodiment, the direction mark may be provided with a timing judgment region TR for judging the operation timing, as shown in FIG. 6A. In FIG. 6A, a circular region provided near the center of the direction mark DM is the timing judgment region TR.

In FIG. 6A, the direction mark DM is moved toward the reference position RP (relative positional relationship between the direction mark DM and the reference position RP is changed in a broad sense). The operation of the player is evaluated by judging whether or not the player operates the operation region of the operation section at a timing at which the position of the timing judgment region TR coincides (almost coincides) with the reference position RP. Specifically, when the player operates the corresponding operation region (MR1, MR2, or MR1 and MR2) at a timing at which the position of the timing judgment region TR coincides with the reference position RP, points are added to the score of the player.

This enables the player to operate the operation region at a suitable timing using the timing judgment region TR as a mark even if the size of the direction mark is large, whereby the operation interface environment of the player can be improved. Specifically, if the size of the direction mark is large, it is difficult for the player to operate the operation region at a certain timing. However, this problem can be solved by providing the timing judgment region TR which is smaller than the direction mark. The shape and the position of the timing judgment region TR are not limited to those shown in FIG. 6A. For example, the timing judgment region TR may have a shape other than a circle, and the timing judgment region TR may be disposed at a position other than the center of the direction mark DM.

2.4 Synchronization Control with Reference Pace

In this type of a music game, the reference timing for operation evaluation is synchronized with a reference pace of the music. This enables the player to easily adjusts the operation timing to the reference timing by operating the operation section corresponding to the reference pace of the music.

However, in a conventional music game, since the player adjusts the operation timing depending on only the reference pace of the music, the player cannot but operate the operation section depending on hearing.

Figure 6B:
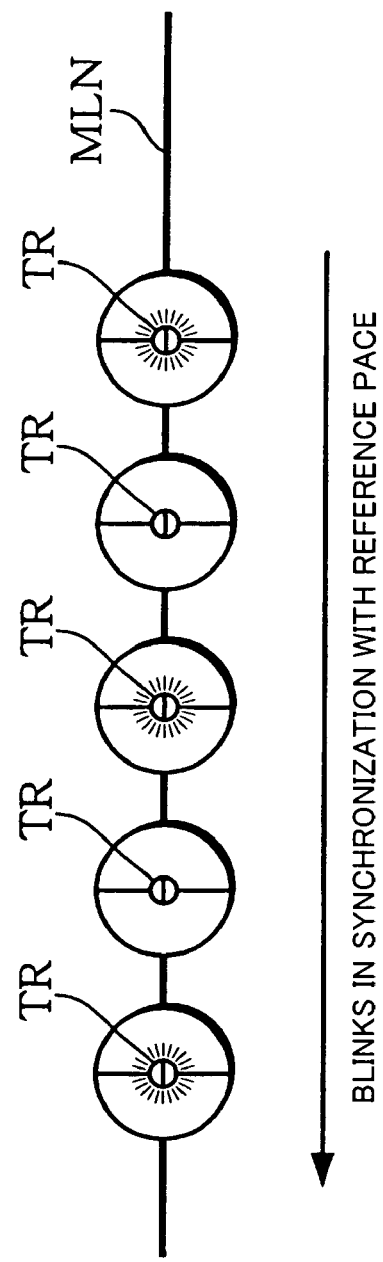

In the present embodiment, display control in which an image of at least a part of the direction mark is changed in synchronization with the reference pace (rhythm in N time such as simple triple time or quadruple time) of the music is performed. In more detail, the timing judgment region TR which is a part of the direction mark is changed in synchronization with the reference pace (rhythm) of the music, as shown in FIG. 6B. This enables the player to easily allow the operation timing to coincide with the reference timing by operating the operation section corresponding to the blink timing of the timing judgment region TR in addition to the reference pace of the music. This further improves the operation interface environment of the player.

In FIG. 6B, the image of a part of the timing judgment region TR is changed. However, the image of other areas may be changed. The image of the entire direction mark may be changed in synchronization with the reference pace of the music. the change in the image is not limited to blinking (change in brightness) as shown in FIG. 6B. The image state such as the color, pattern, or shape of a part or the entirety of the direction mark may be changed corresponding to the reference pace of the music.

2.5 Shape of Direction Mark at the Time of Repeated Beating

In the present embodiment, display control of the direction mark may be performed so that the reference position for timing judgment is positioned in the direction mark at a start timing and a finish timing of repeated operation or continuous operation performed by the player. The term "repeated operation" used herein means that the player repeatedly operates the operation region. The repeated operation is an operation of repeatedly beating the operation region within a predetermined period of time, for example. The term "continuous operation" used herein means that the player continuously operates the operation region. The repeated operation is an operation of continuously pressing or pulling the operation region within a predetermined period of time, for example.

Figure 7A:
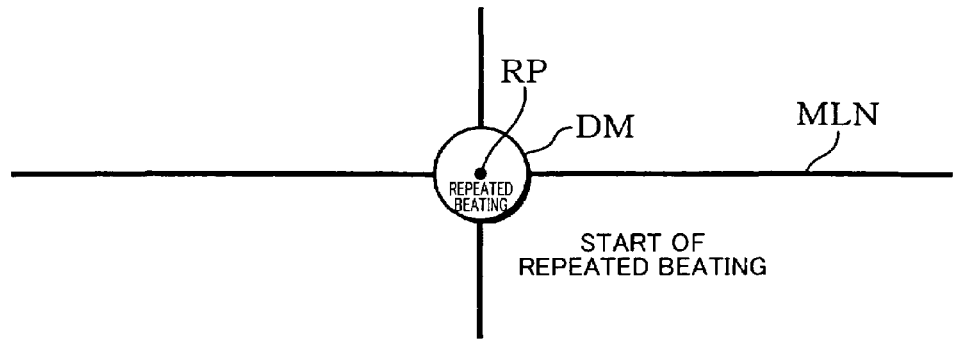
FIGS. 7A, 7B, and 7C are illustrative of display control of a direction mark at the time of repeated beating.

For example, the player starts repeated beating (repeated operation in a broad sense) at a timing shown in FIG. 7A. Specifically, the player starts repeated beating at a timing at which the direction mark DM which directs repeated beating coincides with the reference position RP for timing judgment for the first time (overlap timing). The reference position RP is positioned in the direction mark DM at the start timing of repeated beating.

Figure 7B:
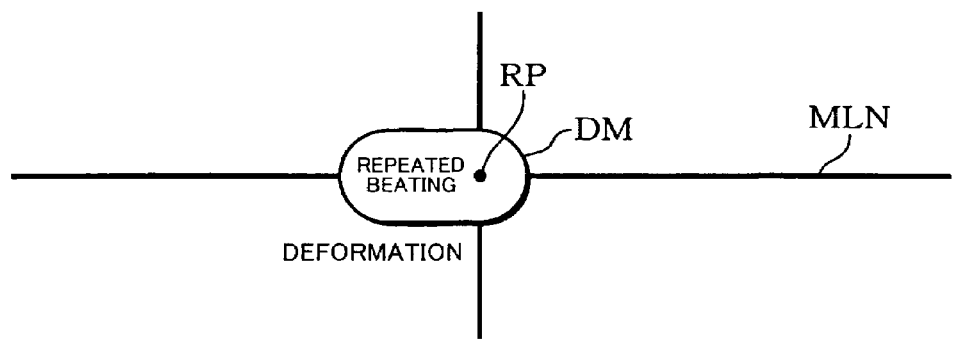

FIG. 7B shows the intermediate timing between the start timing and the finish timing of repeated beating. The reference position RP is also positioned in the direction mark DM at this timing. Specifically, the direction mark DM is deformed so that the reference position RP is positioned in the direction mark DM. The player finishes repeated beating at the timing shown in FIG. 7C. The reference position RP is also positioned in the direction mark DM at the finish timing of repeated beating.

Figure 7C:
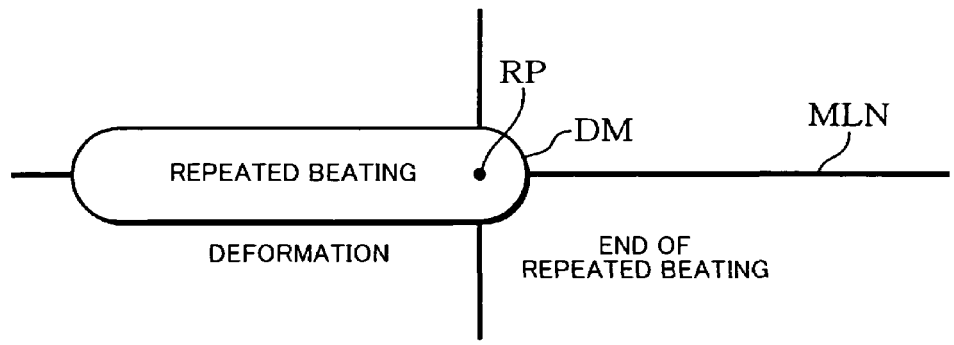

The player can easily recognize the start timing and the finish timing of repeated beating by deforming the direction mark DM in the shapes as shown in FIGS. 7A to 7C, whereby the operation interface environment of the player can be improved.

The operation interface environment of the player can be improved even when the direction mark DM is a mark which directs a continuous operation of the player by deforming the direction mark DM in the shapes as shown in FIGS. 7A to 7C. In FIGS. 7A to 7C, the shape of the direction mark DM is changed as the time elapses from the start timing of repeated beating to the finish timing. However, the direction mark DM may be formed to have a shape as shown in FIG. 7C in advance so that the reference position RP can be positioned in the direction mark DM at the start timing and the finish timing without deforming the direction mark DM.

2.6 Direction for Strong Operation and Weak Operation

In the present embodiment, display control which causes the direction mark to direct the player to perform a strong or weak operation for each operation region may be performed, and, when the player operates a plurality of operation regions, whether the operation performed for each operation region is either a strong operation or a weak operation according to the direction of the direction mark may be judged.

Figure 8:
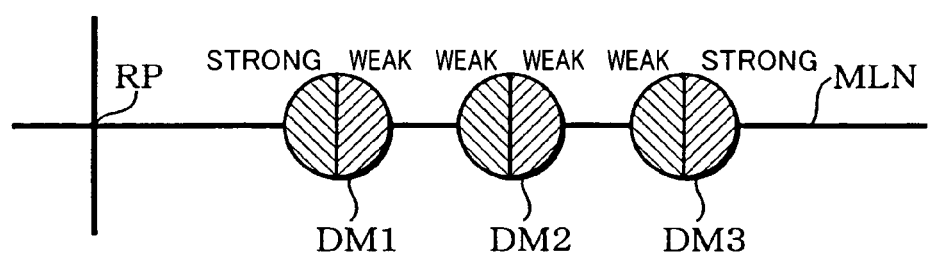
FIG. 8 is illustrative of display control of a direction mark which directs a strong or weak operation.

In FIG. 8, the direction mark DM1 is a mark which directs the player to perform a strong operation for the operation region MR1 shown in FIGS. 1A and 1B and to perform a weak operation for the operation region MR2. The direction mark DM2 is a mark which directs the player to perform weak operations for the operation regions MR1 and MR2. The direction mark DM3 is a mark which directs the player to perform a weak operation for the operation region MR1 and to perform a strong operation for the operation region MR2. Therefore, when the player performs a strong operation for the operation region MR1 and performs a weak operation for the operation region MR2 at a timing at which the direction mark DM1 reaches the position of the reference position RP, points are added to the score. When the player performs weak operations for the operation regions MR1 and MR2 at a timing at which the direction mark DM3 reaches the position of the reference position RP, or when the player performs a weak operation for the operation region MR1 and performs a strong operation for the operation region MR2 at a timing at which the direction mark DM3 reaches the position of the reference position RP, points are added to the score.

This enables evaluation of not only whether or not the player has accurately operated the operation region directed by the direction mark, but also whether or not the player has accurately operated the operation region at the strength directed by the direction mark. Therefore, a more advanced performance operation can be required for the player, whereby the fun of the music game can be increased.

In FIG. 8, the directions for the strong operation and the weak operation are performed by text display. However, the directions for the strong operation and the weak operation may be performed by the difference in color or brightness (image state). For example, the color of the direction region may be black (third color in a broad sense) when directing a strong operation, and the color of the direction region may be green (fourth color in a broad sense) when directing a weak operation. In this case, the left direction region of the direction mark DM1 shown in FIG. 8 is colored black and the right direction region is colored green. The right and left direction regions of the direction mark DM2 are colored green. The left direction region of the direction mark DM3 is colored green and the right direction region is colored black.

FIG. 8 shows the case where the number of direction regions is two. However, the directions for a strong operation and a weak operation may be performed by increasing the number of direction regions to three or more. Detection of whether a strong operation or a weak operation is performed may be realized by using a sensor having a mechanism which can detect the operation strength as the sensor provided in the operation section 160 (160-1 and 160-2) shown in FIGS. 1A and 1B.

2.7 Change in Standard

In the present embodiment, when the timing standards are changed, display control for visually notifying the player of the change in standard may be performed.

For example, the direction mark DM as shown in FIG. 9A is displayed when the timing standard in the evaluation section are normal standards. In more detail, the direction mark DM in which the size of the timing judgment region TR is normal is displayed. The direction mark DM as shown in FIG. 9B is displayed when the timing standards are changed to less severe standard such as in a bonus time, for example. In more detail, the direction mark DM in which the size of the timing judgment region TR is large is displayed. When the timing standards are changed to severer standards, the size of the timing judgment region TR is reduced.

The player can easily know the change in timing standards even when playing the game by being visually notified of the change in timing standards, whereby the game play of the player can be prevented from being hindered. Moreover, the player can easily sense whether the standards have become less severe or more severe by changing the size of the timing judgment region corresponding to the change in timing standards as shown in FIGS. 9A and 9B, whereby the operation interface environment of the player can be improved. Specifically, when the timing standards have become less severe as shown in FIG. 9B, the player can be visually and simply notified that points are added to the score even if the difference in position between the timing judgment region TR and the reference position RP is large.

In FIGS. 9A and 9B, the player is notified of the change in timing standards by the change in the size of the timing judgment region TR. However, the player may be notified of the change in timing standards by the change in the shape of the timing judgment region TR. Or, the player may be notified of the change in timing standards by the change in the color or shape of the direction mark DM.

2.8 Sound Input Operation

In the music game of the present embodiment, the player can perform a plurality of different types of input operations by using the operation section 160 such as a game controller and the sound detection section 162 such as a microphone, as shown in FIGS. 1A and 1B. In more detail, the player enjoys the music game by performing an beat operation (example of operation) and a sound production operation (example of sound input operation).

However, an input device which can also detect environmental sound, such as a microphone, may detect unintentional sound produced by the player. Therefore, it is difficult to accurately detect the input operation when the game-play environment is a noisy place. In particular, when comparatively large operation sound is generated such as when performing a beat operation, an input operation may be erroneously detected by the beat operation sound detected by a microphone.

In the present embodiment, when the operation of the operation section and the sound input operation (sound production operation, handclap, or the like) are input at the same time, the operation of the operation section is given priority.

Figure 10:
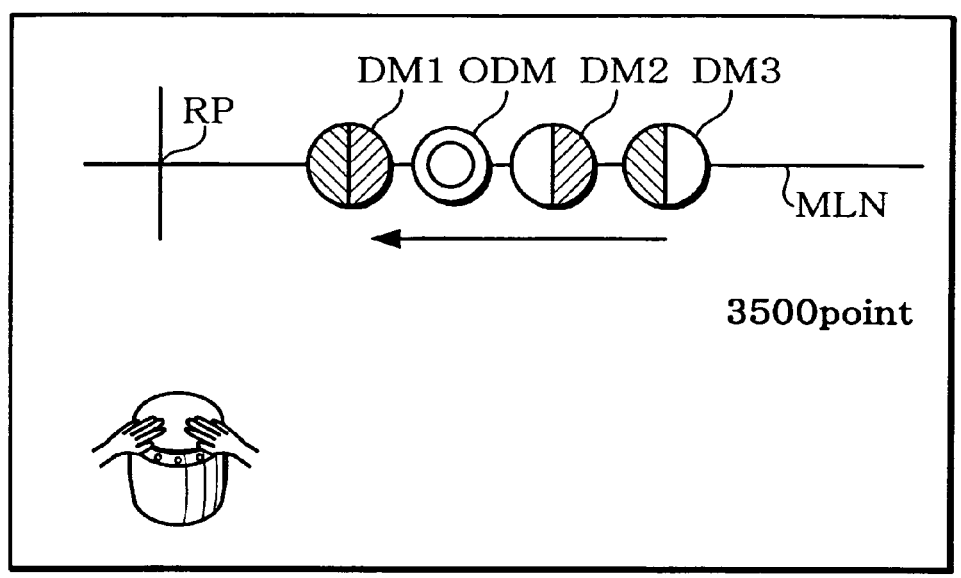
FIG. 10 is illustrative of display control of an operation input direction mark and a sound input direction mark.

For example, in a game image shown in FIG. 10, the operation input direction marks DM1 to DM3 (first direction marks) which direct the player to perform an operation using the operation section, and a sound input direction mark ODM (second direction mark) which directs the player to perform a sound input operation to be detected by the sound detection section are displayed. In more detail, display control in association with reproduction of the music data is performed so that the operation input direction marks DM1 to DM3 and the sound input direction mark ODM almost in the shape of a circle are moved on the line (music) MLN toward the reference position RP (reference mark).

The operation input direction marks DM1 to DM3 and the sound input direction mark ODM are displayed in such a state that the player can distinguish the directions of the operation input direction marks DM1 to DM3 and the sound input direction mark ODM. For example, the operation input direction marks DM1 to DM3 may differ from the sound input direction mark ODM in shape, pattern, color, or the like. The player watches the state of movement of the operation input direction marks DM1 to DM3 and the sound input direction mark ODM through the game image displayed in the display section. The player can score by beating the operation region of the operation section (operating the operation section in a broad sense) at a timing at which each of the operation input direction marks DM1 to DM3 passes through the reference position RP (overlap timing). When the player claps his hands at a timing at which the sound input direction mark ODM passes through the reference position RP (performs a sound input operation in a broad sense), the sound of the handclap is detected by the sound detection section (microphone), whereby the player scores.

In the present embodiment, whether or not the operation of the operation section or the sound input operation detected by the sound detection section is effective (should be used for game calculation) is judged. In more detail, when an operation (beat operation) of the operation section and the sound input operation (handclap) exist at the same time within a unit judgment period (given period in a broad sense; hereinafter the same), only the operation of the operation section is judged to be effective. When the operation of the operation section and the sound input operation do not exist within the unit judgment period, each operation is judged to be effective.

Figure 11A:
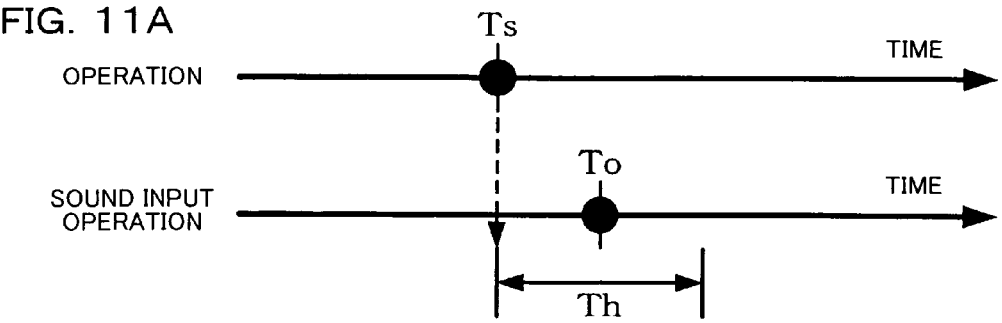
FIGS. 11A to 11D are illustrative of first and second judgment methods.
Figure 11B:
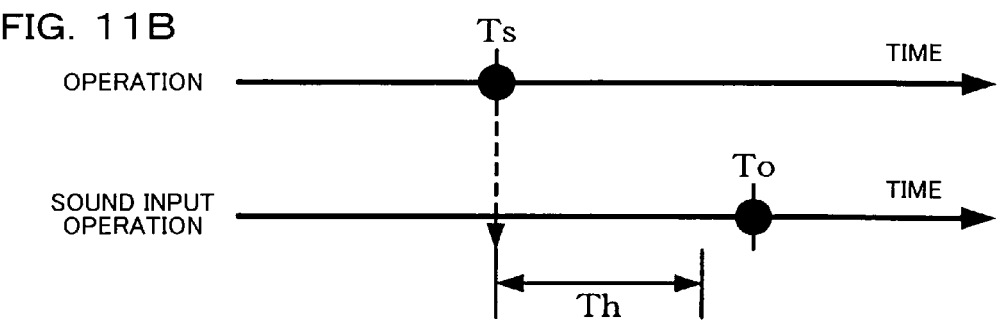

FIGS. 11A and 11B show a first judgment method of the present embodiment. In FIGS. 11A and 11B, judgment is performed using a given period (several seconds or several frames, for example) from a timing Ts at which the operation of the operation section is accepted (or timing To at which the sound input operation is accepted) as a unit judgment period Th, for example.

In more detail, when it is judged that the operation of the operation section and the sound input operation are performed at the same time within the unit judgment period Th as shown in FIG. 11A, the probability that the sound detection section accidentally detects the operation sound of the operation section is high. Therefore, the operation (operation data) of the operation section is judged to be effective in this case.

As shown in FIG. 11B, when the operation of the operation section is accepted at the timing Ts, and the sound input operation is accepted at the timing To after the unit judgment period Th has elapsed, each operation is judged to be effective. This prevents occurrence of a problem in which the sound detection section accidentally detects the operation sound of the operation section and the detected sound is used for the operation evaluation or the sound input evaluation of the player.

Figure 11C:
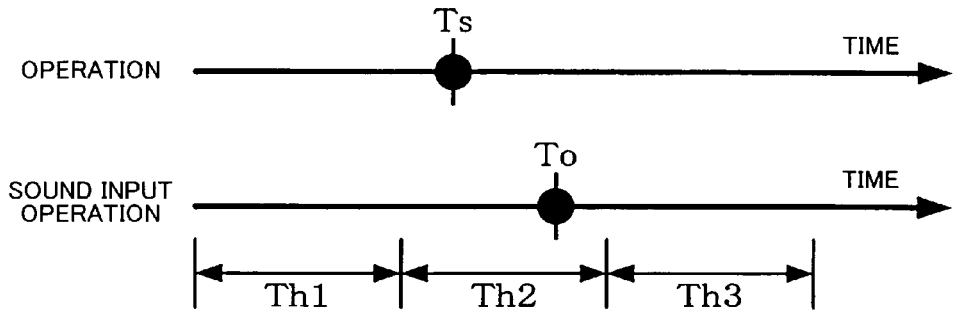
Figure 11D:
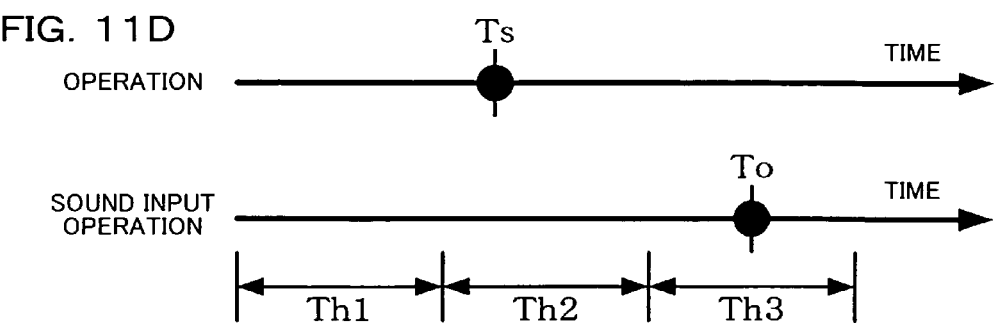

FIGS. 11C and 11D show a second judgment method of the present embodiment. In the second judgment method, unit judgment periods Th1, Th2, . . . , and Thn are set in advance. When the timing of the operation of the operation section and the timing of the sound input operation exist at the same time Inside within each unit judgment period, the operation of the operation section is judged to be effective. When the timing of the operation of the operation section and the timing of the sound input operation exist in different unit judgment periods, each operation is judged to be effective.

In more detail, when the timing Ts of the operation of the operation section and the timing To of the sound input operation exist within the unit judgment period Th2 as shown in FIG. 11C, the operation of the operation section is given priority and is judged to be effective. When the timing Ts of the operation of the operation section exists in the unit judgment period Th2 and the timing To of the sound input operation exists in the unit judgment period Th3 as shown in FIG. 11D, each operation is judged to be effective. This prevents occurrence of a problem in which the sound detection section accidentally detects the operation sound of the operation section and the sound is used for the operation evaluation or the sound input evaluation of the player.

When judging the sound input operation, whether or not the detection volume of the sound detection section corresponding to the sound input operation of which the input has been accepted exceeds the reference volume level may be judged, and only the sound input operation judged to exceed the reference volume level may be judged to be effective. This realizes accurate play evaluation, even if environment noise or the like is detected by the sound detection section, by judging that the environment noise or the like is not effective as the sound input operation. When performing the input judgment using the reference volume level, it is preferable that the reference volume level be adjustable automatically corresponding to the environment noise level or arbitrarily by the player. For example, when the player plays the music game in an environment in which noise is generated, if the reference volume level is low, noise may be detected as the sound input operation. In this case, the sound generated by the sound input operation of the player can be accurately detected by increasing the reference volume level.

In FIG. 10, the direction mark DM1 to DM3 which direct the operation of the operation section and the direction mark ODM which directs the sound input operation are different marks. However, the display control of the direction mark of the present embodiment is not limited thereto. For example, the sound input operation may be included as one of a plurality of operations (simultaneous operation) directed by the direction marks. In more detail, a direction region which directs the sound input operation may be set in the direction marks shown in FIGS. 4A, 4B, and 4C together with the direction region which directs the operation of the operation section. When such a direction mark is displayed, the player performs the operation of the operation section and the sound input operation at the same time.

3. Processing of Present Embodiment

Figure 12:
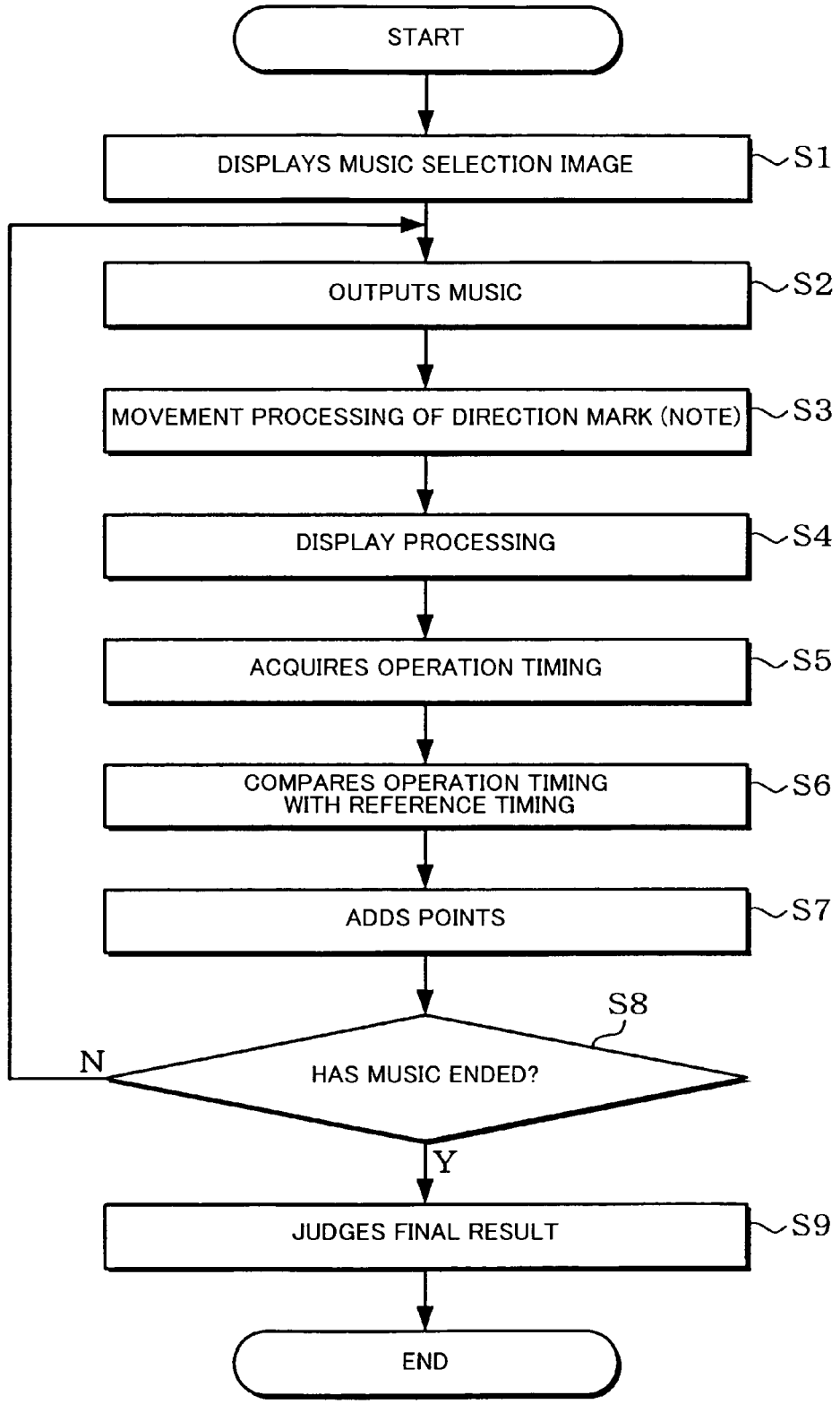
FIG. 12 is a flowchart showing a processing example of one embodiment of the present invention.

A detailed processing example of the present embodiment is described below using flowcharts shown in FIG. 12.

First, processing of displaying an image for allowing the player to select music of a music game is performed (step S1). Processing of outputting the music selected by the player is then performed (step S2).

Movement processing and display processing of the direction mark (note) are performed as described with reference to FIG. 3 (steps S3 and S4). Specifically, the direction mark is moved on the line at a given moving speed. Image data of a direction mark which can direct operations of a plurality of operation regions by one mark is read from the direction mark storage section, and the direction mark of the image data is displayed at the position specified by the movement processing in the step S3. In this case, the direction mark is displayed by the display control described with reference to FIGS. 3 to 11D. The reference position (reference mark) may be moved toward the direction mark in the movement processing in the step S3.

Processing of acquiring the operation timing is performed (step S5). Specifically, when the player operates the operation section according to the direction of the direction mark displayed by the movement processing and the display processing in the steps S3 and S4, the data (operation data) of the operation timing input by the player is sampled in frame units, and retained in the operation data storage buffer, for example.

Comparison processing between the acquired operation timing and the timing standard is performed (step S6). Specifically, the comparison processing between the data of the operation timing stored in the storage buffer and the data of the timing standard stored in the reference timing data storage section is performed. For example, the comparison processing is performed so that the evaluation of the operation of the player becomes higher as the difference between the operation timing and the reference timing becomes smaller, as shown in FIG. 5A. As shown in FIG. 5A, comparison processing of evaluating the operation of the player is performed based on the operation timing of one of two operations which differs from the reference timing to a larger extent.

Addition processing of the score of the player is performed (step S7). In more detail, points corresponding to the evaluation of the operation of the player by the comparison in the step S6 are added to the score of the player.

Whether or not the music has been ended is judged (step S8). When the music has not been ended, the operation returns to the step S2. When the music has been ended, the final game result of the player is judged and displayed (step S9).

4. Example of Using Mask-Displayed Direction Mark

Figure 13A:
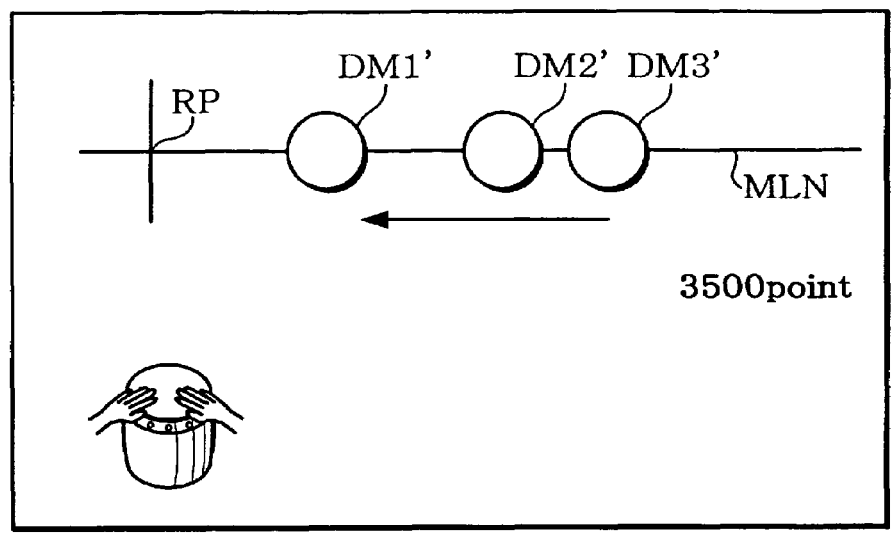
FIGS. 13A and 13B are illustrative of an example of using a mask-displayed direction mark in an embodiment of the present invention.
Figure 14A:
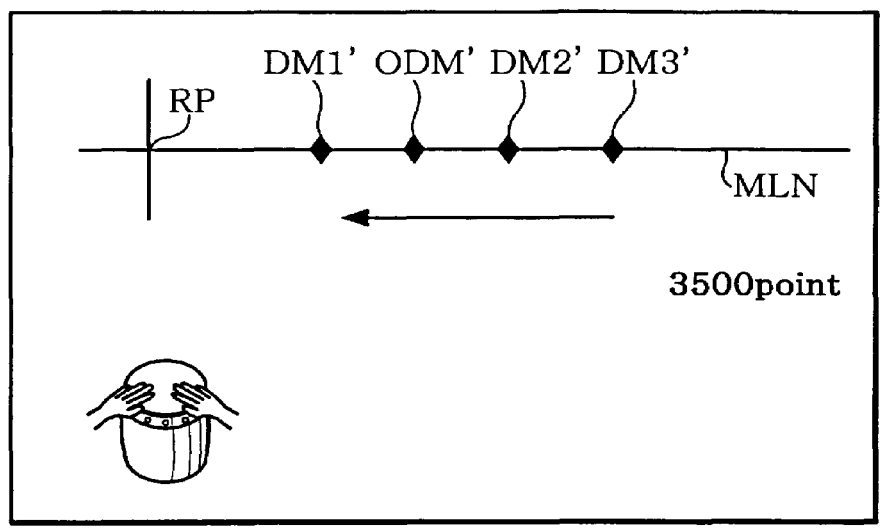
FIGS. 14A and 14B are illustrative of another example of using a mask-displayed direction mark in an embodiment of the present invention.
Figure 14B:
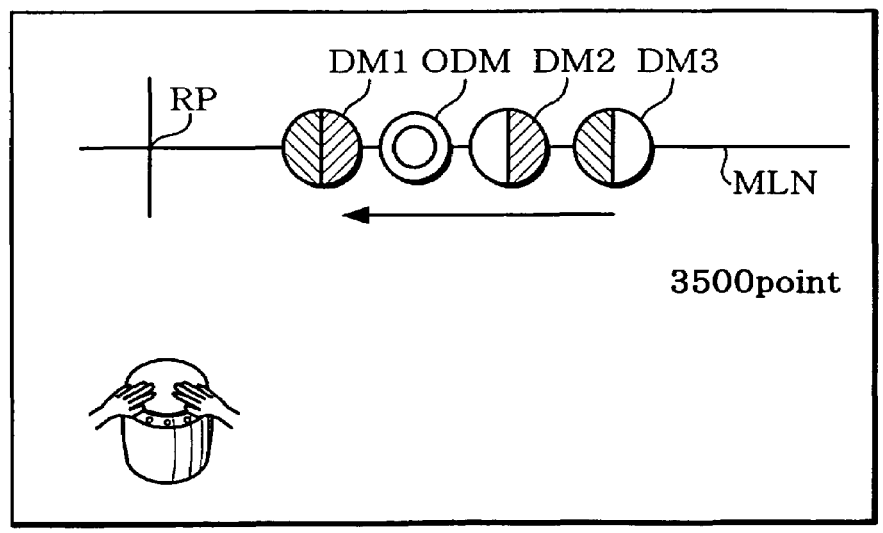
Figure 15:
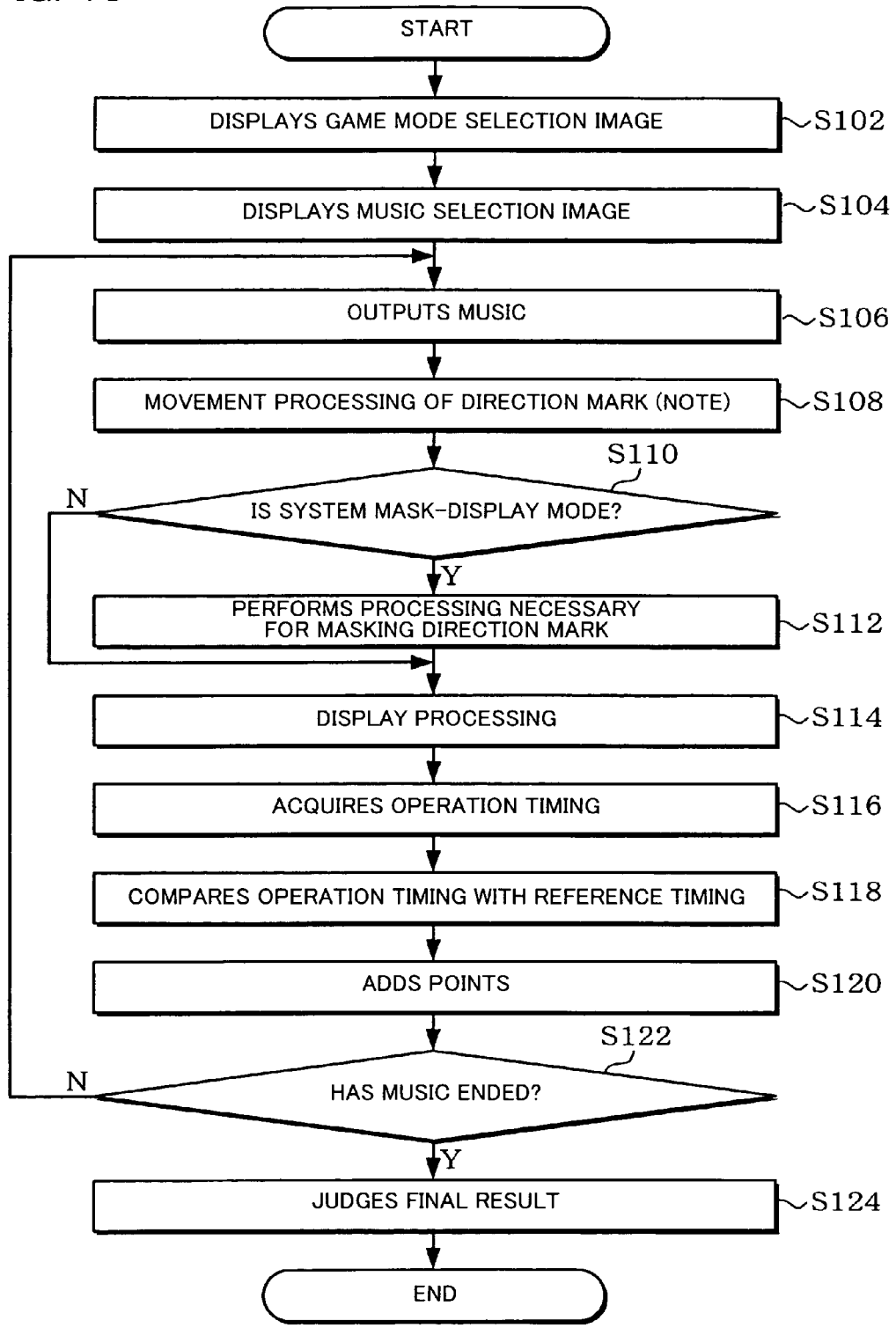
FIG. 15 is a flowchart illustrating a processing example using a mask-displayed direction mark in an embodiment of the present invention.

FIGS. 13 to 15 are illustrative of an example of using a mask-displayed direction mark in the present embodiment.

Figure 13B:
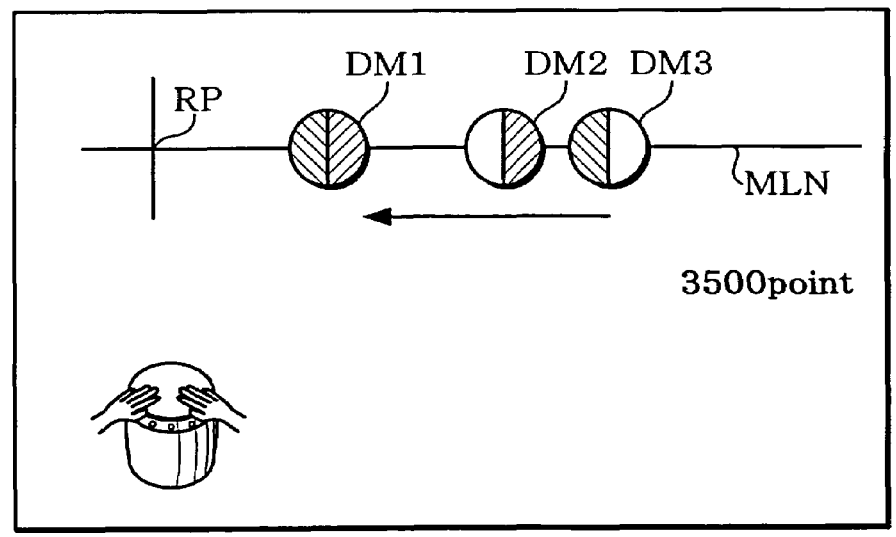

FIG. 13B shows an example of a display image when the player selects predetermined music A in a normal mode.

In FIG. 13B, the circular direction marks DM1 to DM3 are moved on the line MLN from the right to the left of the screen. The player can score by operating the operation section 160 at a timing at which each of the direction marks DM1 to DM3 coincides (almost coincides) with a reference position RP for timing judgment (reference mark or reference line).

In more detail, in FIG. 3, the direction mark DM 1 on the left is a mark which directs simultaneous operations of the operation regions MR1 and MR2, the direction mark DM 2 in the middle is a mark which directs an operation of the operation region MR2 on the right, and the direction mark DM 3 on the right is a mark which directs an operation of the operation region MR1 on the left in FIGS. 1A and 1B. Therefore, when the player succeeds in performing simultaneous operations (simultaneous beating) of the operation regions MR1 and MR2 at the timing at which the direction mark DM1 reaches the position RP, points are added to the score of the player. Points are added to the score of the player when the player operates the operation region MR2 at a timing at which the direction mark DM2 reaches the position of RP or operates the operation region MR1 at a timing at which the direction mark DM3 reaches the position of RP.

FIG. 13A shows an example of a display image when the player selects the predetermined music A in a mask display mode in the same manner as in FIG. 13B. The mask display mode is a mode which allows the player to play the game while displaying a direction mark which is mask-displayed so that the player cannot determine the direction of each direction mark of the selected music relating to the operation content.

Direction marks DM1' to DM3' shown in FIG. 13A are mask-displayed direction marks respectively corresponding to the direction marks DM1 to DM3 shown in FIG. 13B. The mask-displayed direction marks DM1' to DM3' perform the same movement operation as the direction marks DM1 to DM3 before masking with respect to the reference position (reference mark or reference line) PR.

However, since the mask-displayed direction marks DM1' to DM3' are masked (displayed solidly without a color and a pattern in this case ) so that the content (color or pattern) of the direction mark cannot be known, the player cannot know the operation content (operation for the operation regions MR1 and MR2) from the displayed image.

Therefore, the player can score by judging the operation content (operation for the operation regions MR1 and MR2) by himself and operating the operation section 160 at a timing at which each of the mask-displayed direction marks DM1' to DM3' coincides (almost coincides) with the reference position (reference mark or reference line) RP.

Therefore, the player who remembers the operation content for the predetermined music A can score by playing the music according to his memory, for example.

FIG. 14B shows an example of a display image when the player selects predetermined music B (with sound input such as handclap) in the normal mode.

In the game image shown in FIG. 14B, the operation input direction marks DM1 to DM3 (first direction marks) which direct the player to perform an operation using the operation section, and a sound input direction mark ODM (second direction mark) which directs the player to perform a sound input operation to be detected by the sound detection section are displayed. In more detail, display control in association with reproduction of the music data is performed so that the operation input direction marks DM1 to DM3 and the sound input direction mark ODM almost in the shape of a circle are moved on the line (music) MLN toward the reference position RP (reference mark).

The operation input direction marks DM1 to DM3 and the sound input direction mark ODM are displayed in such a state that the player can distinguish the directions of the operation input direction marks DM1 to DM3 and the sound input direction mark ODM. For example, the operation input direction marks DM1 to DM3 may differ from the sound input direction mark ODM in shape, pattern, color, or the like. The player watches the state of movement of the operation input direction marks DM1 to DM3 and the sound input direction mark ODM through the game image displayed in the display section. The player can score by beating the operation region of the operation section (operating the operation section in a broad sense) at a timing at which each of the operation input direction marks DM1 to DM3 passes through the reference position RP (overlap timing). When the player claps his hands at a timing at which the sound input direction mark ODM passes through the reference position RP (performs a sound input operation in a broad sense), the sound of the handclap is detected by the sound detection section (microphone), whereby the player scores.

FIG. 14A shows an example of a display image when the player selects the predetermined music B in the mask display mode in the same manner as in FIG. 14B. The mask display mode is a mode which allows the player to play the game while displaying a direction mark which is mask-displayed so that the player cannot determine the direction of each direction mark of the selected music relating to the operation content.

The direction marks DM1' to DM3' and ODM' shown in FIG. 14A are mask-displayed direction marks respectively corresponding to the direction marks DM1 to DM3 and ODM shown in FIG. 13B. The mask-displayed direction marks DM1' to DM3' and ODM' perform the same movement operation as the direction marks DM1 to DM3 and ODM before masking with respect to the reference position (reference mark or reference line) PR.

The direction marks DM1' to DM3' and ODM' are displayed as constant marks irrespective of the operation content. Therefore, the player cannot know the operation content (operation for the operation regions MR1 and MR2 and timing for handclap) from the displayed image.

Therefore, the player can score by judging the operation content (operation for the operation, regions MR1 and MR2) by himself and operating the operation section 160 or clapping his hands at a timing at which each of the mask-displayed direction marks DM1' to DM3' and ODM' coincides (almost coincides) with the reference position (reference mark or reference line) RP.

Therefore, the player who remembers the operation content for the predetermined music B can score by playing the music according to his memory, for example.

FIG. 15 is a flowchart illustrating a processing example using the mask-displayed direction mark in the present embodiment.

First, processing of displaying an image for allowing the player to select the mode of a music game is performed (step S102). The player can select the game mode such as the normal mode or the mask display mode.

Processing of displaying an image for allowing the player to select music of the music game is performed (step S104). Processing of outputting the music selected by the player is performed (step S106).

Movement processing of the direction mark (note) or the mask-displayed direction mark is performed as described with reference to FIGS. 3, 13A, and 13B (step S108). Since the movement operations of the direction mark (note) and the mask-displayed direction mark are the same (if the music is the same), the position calculation of the direction mark (note) and the mask-displayed direction mark is the same irrespective of whether the normal mode or the mask display mode is selected.

Whether or not the mode is the mask display mode is judged, and, when the mode is the mask display mode, processing necessary for masking the direction mark is performed (steps S110 and S112).

Display processing using the direction mark or the mask-displayed direction mark is performed (step S114). Specifically, the direction mark or the mask-displayed direction mark is moved on the line at a given moving speed. In the normal mode, image data of a direction mark which can direct operations of a plurality of operation regions by one mark is read from the direction mark storage section, and the direction mark of the image data is displayed at the position specified by the movement processing in the step S3. In this case, the direction mark is displayed by the display control described with reference to FIGS. 3 to 11D. The reference position (reference mark) may be moved toward the direction mark in the movement processing in the step S3.

Processing of acquiring the operation timing is performed (step S116). Specifically, when the player operates the operation section according to the direction of the direction mark displayed by the movement processing and the display processing in the steps S3 and S4, the data (operation data) of the operation timing input by the player is sampled in frame units, and retained in the operation data storage buffer, for example.

Comparison processing between the acquired operation timing and the timing standard is performed (step S118). Specifically, the comparison processing between the data of the operation timing stored in the storage buffer and the data of the timing standard stored in the reference timing data storage section is performed. For example, the comparison processing is performed so that the evaluation of the operation of the player becomes higher as the difference between the operation timing and the reference timing becomes smaller, as shown in FIG. 5A. As shown in FIG. 5A, comparison processing of evaluating the operation of the player is performed based on the operation timing of one of two operations which differs from the reference timing to a larger extent.

Addition processing of the score of the player is performed (step S120). In more detail, points corresponding to the evaluation of the operation of the player by the comparison in the step S118 are added to the score of the player. The operation content information used for the standard of the processing in the step S118 is the same in the normal mode and the mask display mode. For example, the degree of difficulty in the standard may be allowed to differ between the normal mode and the mask display mode in the timing judgment and caused to be reflected in the addition of points.

Whether or not the music has been ended is judged (step S122). When the music has not been ended, the operation returns to the step S106. When the music has been ended, the final game result of the player is judged and displayed (step S124).

The present invention is not limited to the above-described embodiment. Various modifications and variations are possible.

For example, the terms (operation regions MR1 and MR2, circle, yellow, blue, black, green, repeated beating, image state, and the like) cited in the description in the specification or the drawings as the terms in a broad sense or in a similar sense (a plurality of operation regions, first shape, first color, second color, third color, fourth color, repeated operation, color and brightness, and the like) may be replaced by the terms in a broad sense or in a similar sense in another description in the specification or the drawings.

The invention according to the dependent claim may have a configuration in which some of the constituent elements of the claim on which the invention is dependent are omitted. It is possible to allow the feature of the invention according to one independent claim to depend on another independent claim.

For example, when directing the operation region to be operated using the direction mark, the color of the operation region of the operation section may be changed, or the operation region may be caused to blink. For example, when directing an operation of the right operation region such as the direction mark DM 2 shown in FIG. 3, the color of the area of the operation region MR2 shown in FIGS. 1A and 1B is changed using a light emitting diode or the like, or the operation region MR2 is caused to blink using an illumination device. The change in color, blinking, or the like may be realized by transmitting data which directs the change in color or blinking to the operation section 160 from the main device 10.

The above embodiment is described taking the case of using a mark in which the color and the pattern are covered as shown in FIG. 13A as the mask-displayed direction mark and the case of using a mark which has a constant shape irrespective of the direction content as shown in FIG. 14A as the mask-displayed direction mark as examples. However, the present invention is not limited thereto. It suffices that the mask-displayed direction mark allow the operation timing to be known without allowing the operation content to be known.

The present invention is suitable for a music game using an operation section which imitates the shape of a percussion instrument as shown in FIGS. 1A and 1B. However, the present invention may be applied to a music game using a musical instrument other than the percussion instrument. The present invention may also be applied to a music game without using a musical instrument.

The present invention may be applied to various image generation systems (game systems) such as an arcade game system, consumer game system, large-scale attraction system in which a number of players participate, simulator, multimedia terminal, or portable telephone.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer-readable storage medium including a program for a music game in which a player plays by operating an operation section, the program causing a computer to function as:
    a direction mark storage section which stores image data of a direction mark which directs an operation which is performed by the player using the operation section;
    a display control section which performs display control of a plurality of display objects including the direction mark based on the image data of the direction mark;
    a timing acquisition section which acquires an operation timing when the player operates the operation section according to a direction of the direction mark; and
    an evaluation section which compares the operation timing with a reference timing and evaluates the operation of the player based on a comparison result,
    wherein the display control section performs display control of displaying the direction mark which directs the player to operate a plurality of operation regions of the operation section by one mark and another direction mark which directs the player to operate one operation region of the operation section on a same line, display control of changing a relative positional relationship between the direction mark and a reference position for timing judgment to cause the direction mark and the reference position to come closer on the same line, and display control of changing a relative positional relationship between the another direction mark and the reference position to cause the another direction mark and the reference position to come closer on the same line, and
    wherein the direction mark has a plurality of direction regions in which each direction region respectively corresponds to each operation region of the operation section and a position of each operation region respectively corresponds to a position of each direction region.

2. The computer-readable storage medium as defined in claim 1,
    wherein the display control section performs display control of the direction mark, the direction mark comprising a plurality of direction regions, each of the direction regions corresponding to one of the operation regions of the operation section.

3. The computer-readable storage medium as defined in claim 1,
    wherein the display control section performs display control of the direction mark which has a first shape and a first color when directing the player to operate one of the operation regions of the operation section and has the first shape and a second color when directing the player to operate a plurality of the operation regions.

4. The computer-readable storage medium as defined in claim 1,
    wherein, when the player operates a plurality of the operation regions of the operation section according to a direction of the direction mark, the evaluation section evaluates the operation of the player by comparing the operation timing for the plurality of operation regions and the reference timing.

5. The computer-readable storage medium as defined in claim 1,
    wherein the evaluation section evaluates the operation of the player by extracting two operations performed at operation timings between which a time interval is shortest among a plurality of operations performed for the plurality of the operation regions, and comparing the operation timing with the reference timing for one of the two extracted operations of which the operation timing differs to a larger extent from the reference timing.

6. The computer-readable storage medium as defined in claim 1,
    wherein the direction mark includes a timing judgment region for judging the operation timing, and
    wherein the evaluation section evaluates the operation of the player by judging whether or not the player has operated the operation regions of the operation section at a timing at which a position of the timing judgment region of the direction mark coincides with the reference position.

7. The computer-readable storage medium as defined in claim 1,
    wherein the display control section performs display control of changing an image of at least a part of the direction mark in synchronization with a reference pace of music.

8. The computer-readable storage medium as defined in claim 1,
    wherein the display control section performs display control of the direction mark so that the reference position for timing judgment is positioned within the direction mark at both timings at which the player starts and finish a repeated operation or continuous operation using the operation section.

9. The computer-readable storage medium as defined in claim 1, wherein the display control section performs display control of causing the direction mark to direct the player to perform a strong operation or a weak operation for each of the operation regions of the operation section, and wherein, when the player operates a plurality of the operation regions of the operation section, the evaluation section evaluates the operation of the player by judging whether the operation performed for each of the operation regions is the strong operation or the weak operation according to the direction of the direction mark.

10. The computer-readable storage medium as defined in claim 1, wherein, when a standard of the timing judgment in the evaluation section changes, the display control section performs display control of visually notifying the player that the standard of the timing judgment has changed.

11. The computer-readable storage medium as defined in claim 1, wherein the display control section performs control of displaying a first direction mark which directs the player to perform an operation which is performed by using the operation section, and a second direction mark which directs the player to perform a sound input operation which is detected by a sound detection section, and wherein, in a case in which the operation of the operation section and the sound input operation by the player are judged to have been performed within the same period, the timing acquisition section judges that the operation of the operation section is effective and acquires operation timing of the operation of the operation section, and, in a case other than the case in which the operation of the operation section and the sound input operation by the player are judged to have been performed within the same period, the timing acquisition section judges that the operation of the operation section and the sound input operation are effective and acquires the operation timings of the operation of the operation section and the sound input operation.

12. The computer-readable storage medium as defined in claim 1, wherein the display control section uses a mask-displayed direction mark, and performs display control of changing a relative positional relationship between the mask-displayed direction mark and the reference position for timing judgment based on movement operation information of the direction mark before masking corresponding to the mask-displayed direction mark, wherein the timing acquisition section acquires an operation timing when the player operates the operation section according to a direction of the mask-displayed direction mark, and wherein the evaluation section compares the acquired operation timing with the reference timing based on operation content information of the direction mark before masking corresponding to the mask-displayed direction mark, and evaluates the operation of the player based on a comparison result.

13. A computer-readable storage medium including a program for a percussion instrument game in which a player plays by performing an operation of beating a percussion instrument type controller, the program causing a computer to function as:

a direction mark storage section which stores image data of a direction mark which directs a beat operation which is performed by the player using the percussion instrument type controller;

a display control section which performs display control of a plurality of display object including the direction mark based on the image data of the direction mark;

a timing acquisition section which acquires a beat timing when the player has performed an operation of beating the percussion instrument type controller according to a direction of the direction mark; and an evaluation section which compares the beat timing with a reference timing and evaluates the beat operation of the player based on a comparison result, wherein the display control section performs display control of displaying the direction mark which directs the player to operate a plurality of beat regions of the percussion instrument type controller by one mark and another direction mark which directs the player to operate one operation region of the operation section on a same line, the display control of changing a relative positional relationship between the direction mark and a reference position for timing judgment to cause the direction mark and the reference position to come closer on the same line, and the display control of changing a relative positional relationship between the another direction mark and the reference position to case the another direction mark and the reference position to come closer on the same line, and wherein the direction mark has a plurality of direction regions in which each direction region respectively corresponds to each operation region of the operation section and a position of each operation region respectively corresponds to a position of each direction region.

14. The computer-readable storage medium as defined in claim 13, wherein the display control section uses a mask-displayed direction mark, and performs display control of changing a relative positional relationship between the mask-displayed direction mark and the reference position for timing judgment based on movement operation information of the direction mark before masking corresponding to the mask-displayed direction mark, wherein the timing acquisition section acquires the beat timing when the player performs the operation of beating the percussion instrument type controller according to a direction of the mask-displayed direction mark, and wherein the evaluation section compares the beat timing with the reference timing based on operation content information of the direction mark before masking corresponding to the mask-displayed direction mark, and evaluates the operation of beating of the player based on a comparison result.

15. A game method for a music game in which a player plays by operating an operation section, the method comprising:

storing image data of a direction mark which directs an operation which is performed by the player using the operation section;

performing display control of a plurality of display objects including the direction mark based on the image data of the direction mark;

acquiring an operation timing when the player operates the operation section according to a direction of the direction mark;

comparing the operation timing with a reference timing and evaluating the operation of the player based on a comparison result; and performing display control of displaying the direction mark which directs the player to operate a plurality of operation regions of the operation section by one mark and another direction mark which directs the player to operate one operation region of the operation section on a same line, and changing a relative positional relationship between the direction mark and a reference position for timing judgment to cause the direction mark and the reference position to come closer.

16. The game method as defined in claim 15, further comprising:

using a mask-displayed direction mark, and performing display control of changing a relative positional relationship between the mask-displayed direction mark and the reference position for timing judgment based on movement operation information of the direction mark before masking corresponding to the mask-displayed direction mark;

acquiring an operation timing when the player operates the operation section according to a direction of the mask-displayed direction mark; and comparing the operation timing with the reference timing based on operation content information of the direction mark before masking corresponding to the mask-displayed direction mark, and evaluating the operation of the player based on a comparison result.

17. A game method for a percussion instrument game in which a player plays by performing an operation of beating a percussion instrument type controller, the method comprising:

storing image data of a direction mark which directs a beat operation which is performed by the player using the percussion instrument type controller;

performing display control of a plurality of display object including the direction mark based on the image data of the direction mark;

acquiring a beat timing when the player has performed an operation of beating the percussion instrument type controller according to a direction of the direction mark;

comparing the beat timing with a reference timing and evaluating the beat operation of the player based on a comparison result; and performing display control of displaying the direction mark which directs the player to operate a plurality of beat regions of the percussion instrument type controller by one mark and another direction mark which directs the player to operate one beat region of the percussion instrument type controller on a same line, and changing a relative positional relationship between the direction mark and a reference position for timing judgment to cause the direction mark and the reference position to come closer.

18. The game method as defined in claim 17, further comprising:

using a mask-displayed direction mark, and performing display control of changing a relative positional relationship between the mask-displayed direction mark and the reference position for timing judgment based on movement operation information of the direction mark before masking corresponding to the mask-displayed direction mark;

acquiring the beat timing when the player performs the operation of beating the percussion instrument type controller according to a direction of the mask-displayed direction mark; and comparing the beat timing with the reference timing based on operation content information of the direction mark before masking corresponding to the mask-displayed direction mark, and evaluating the operation of beating of the player based on a comparison result.

* * * * *